United States Patent
Seo et al.

(10) Patent No.: US 10,754,483 B2
(45) Date of Patent: Aug. 25, 2020

(54) FLEXIBLE DISPLAY DEVICE AND METHOD OF DRIVING THE SAME

(71) Applicant: Samsung Display Co., Ltd., Yongin-si (KR)

(72) Inventors: Young Seok Seo, Seoul (KR); Won-Ki Hong, Suwon-si (KR); Jung Hyun Kim, Yongin-si (KR); Hyoung Wook Jang, Sejong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/576,828

(22) Filed: Sep. 20, 2019

(65) Prior Publication Data

US 2020/0012367 A1 Jan. 9, 2020

Related U.S. Application Data

(63) Continuation of application No. 15/664,439, filed on Jul. 31, 2017, now Pat. No. 10,444,917.

(30) Foreign Application Priority Data

Sep. 1, 2016 (KR) ........................ 10-2016-0112744

(51) Int. Cl.
*G06F 3/044* (2006.01)
*G06F 1/16* (2006.01)
*G06F 3/041* (2006.01)

(52) U.S. Cl.
CPC ............ *G06F 3/044* (2013.01); *G06F 1/1643* (2013.01); *G06F 1/1649* (2013.01);
(Continued)

(58) Field of Classification Search
CPC ....... G06F 3/044; G06F 3/1643; G06F 1/1643
(Continued)

(56) References Cited

U.S. PATENT DOCUMENTS 9,274,562 B2 3/2016 Franklin et al.
2011/0187681 A1* 8/2011 Kim ...................... G06F 1/1652
345/204

(Continued)

FOREIGN PATENT DOCUMENTS

KR 10-1329946 11/2013

OTHER PUBLICATIONS

Non-Final Office Action dated Feb. 5, 2019, in U.S. Appl. No. 15/664,439.
(Continued)

*Primary Examiner* — Calvin C Ma
(74) *Attorney, Agent, or Firm* — H.C. Park & Associates, PLC

(57) ABSTRACT

A flexible display device and a method of driving a flexible display device, in which the method of driving the flexible display device includes detecting a capacitance change with respect to at least some coordinates of a display area, determining whether bending is occurring through the detected capacitance change, and setting a driving mode in response to a result of the step of determining whether bending is occurring. The driving mode is converted into a bending mode when it is determined that bending is occurring, and the driving mode is set into a force touch mode when it is determined that bending is not occurring.

20 Claims, 31 Drawing Sheets

(52) U.S. Cl.
CPC .......... *G06F 1/1652* (2013.01); *G06F 3/0414* (2013.01); *G06F 3/0416* (2013.01); *G06F 3/0418* (2013.01); *G06F 2203/04102* (2013.01)

(58) Field of Classification Search
USPC .......................................... 345/87, 173, 174
See application file for complete search history.

(56) References Cited

U.S. PATENT DOCUMENTS

| | | | |
|---|---|---|---|
| 2012/0127087 A1* | 5/2012 | Ma | G06F 1/1652 345/173 |
| 2014/0029017 A1 | 1/2014 | Lee et al. | |
| 2016/0195938 A1 | 7/2016 | Kim et al. | |
| 2017/0344149 A1 | 11/2017 | Ramakrishnan et al. | |

OTHER PUBLICATIONS

Notice of Allowance dated Jun. 5, 2019, in U.S. Appl. No. 15/664,439.

\* cited by examiner

FLEXIBLE DISPLAY DEVICE AND METHOD OF DRIVING THE SAME

CROSS-REFERENCE TO RELATED APPLICATION

This application is a continuation of U.S. patent application Ser. No. 15/664,439, filed on Jul. 31, 2017, and claims priority from and the benefit of Korean Patent Application No. 10-2016-0112744, filed on Sep. 1, 2016, each of which is hereby incorporated by reference for all purposes as if fully set forth herein.

BACKGROUND

Field

The invention relate generally to a display device, and, more particularly, to a display device that is flexible and to a method of driving the same.

Discussion of the Background

With the development of electronic technology, various types of display devices have been marketed. Particularly, electronic apparatuses including display devices, such as TVs, PCs, laptop computers, mobile phones, and MP3 players, have been sold to consumers at such a high penetration rate that they are used in most homes.

Recently, efforts to develop new types of display devices have been made in order to meet the demands of users desiring new and diverse functions. So-called next-generation display devices are an example. And, as an example of next-generation display devices, there are flexible display devices.

A flexible display device is typically a display device in which the form of a display unit on which an image is displayed can be varied.

The shape of the flexible display device can be changed by bending the flexible display device by way of a force applied to the apparatus by a user for example, and various methods may be used to drive the flexible display device depending on the changed shape of the flexible display device.

Meanwhile, recently, a display device mounted in an electronic apparatus may also be used as a means for accepting a user's input on a touch panel concurrently with being used as a means for displaying an image.

The electronic apparatus can calculate the horizontal position of user's touch input based on various types of user's touch inputs. For example, the electronic apparatus can determine a position at which two electrodes cross each other as a position of input by detecting the capacitance change between the two electrodes included in a touch panel.

Further, the electronic apparatus can calculate the vertical position of users' touch input based on various types of user's touch inputs. For example, the electronic apparatus may include a force touch panel in addition to a display panel to detect the capacitance change depending on the change in distance between two electrodes included in the force touch panel, thereby detecting pressure corresponding to the capacitance change.

Meanwhile, recently, an electronic apparatus has been mounted with a flexible display device, and thus it has been required to detect the bending of the flexible display device or the bending degree thereof.

An electronic apparatus has been mounted with a sensor capable of determining additional bending in order to determine the existence of bending of a flexible display device or the bending degree thereof.

However, when a sensor for determining only the bending of a flexible display device is included, there is a problem of increasing manufacturing costs.

Therefore, it may be desirable to develop a structure and method capable of determining the existence and/or degree of bending of a flexible display device without providing an additional sensor.

The above information disclosed in this Background section is only for enhancement of understanding of the background of the inventive concept, and, therefore, it may contain information that does not form the prior art that is already known in this country to a person of ordinary skill in the art.

SUMMARY

Electronic devices constructed according to the principles of the invention include a flexible display device that can determine the existence and/or degree of bending of the flexible display without providing an additional sensor.

Exemplary methods of driving a flexible display device employing the inventive concepts also can determine the existence and/or degree of bending of the flexible display without providing an additional sensor.

Additional aspects will be set forth in the detailed description which follows, and, in part, will be apparent from the disclosure, or may be learned by practice of the inventive concept.

However, aspects of the invention are not restricted to the one set forth herein. The above and other aspects of the invention will become more apparent to one of ordinary skill in the art to which the invention pertains by referencing the detailed description of the invention given below.

According to a first aspect of the invention, a method of driving a flexible display device, includes detecting a capacitance change with respect to at least some coordinates of a display area determining whether bending is occurring through the detected capacitance change, and setting a driving mode in response to a result of the step of determining whether bending is occurring, wherein the driving mode is set into a bending mode when it is determined that bending is occurring, and is set into a force touch mode when it is determined that bending is not occurring.

The step of determining whether bending is occurring include detecting bending coordinates at which the capacitance change is greater than a first reference capacitance change, and detecting whether the detected bending coordinates form a line.

The step of determining whether bending is occurring may include determining that bending is not occurring when the bending coordinates are not detected or when the bending coordinates do not form a line.

The method may further include, when driving is performed in the bending mode, determining a bending angle from the detected capacitance change, and selecting one mode from a plurality of display modes providing different functions to the display area in response to determining the bending angle.

It may be determined that the bending angle increases as the capacitance change increases.

The method may further include, when driving is performed in the bending mode, determining a position at which the line of bending coordinates is disposed, and selecting one mode from a plurality of display modes providing different functions to the display area based on the position at which the line is disposed.

The method may further include, when it is determined that bending coordinates at which the capacitance change is greater than the first reference capacitance change do not form a line, determining that the capacitance change is noise.

The method may further include, when it is determined that bending is not occurring, detecting touch coordinates at which the capacitance change is greater than a second reference capacitance change, wherein the second reference capacitance change is greater than the first reference capacitance change.

In the step of setting the driving mode, driving may be set to the force touch mode when the touch coordinates are detected.

The line may be a straight line formed by connecting both ends of the display area.

The step of determining whether bending is occurring may include detecting bending coordinates at which the capacitance change is greater than a first reference capacitance change, and comparing the bending coordinates with stored bending reference coordinates to determine that bending is occurring when the bending coordinates include all of the bending reference coordinates.

According to a second aspect of the invention, a flexible display device comprises a display unit configured to display an image, a detection unit configured to detect capacitance changes with respect to at least some coordinates of the display unit, a determination unit configured to determine whether bending is occurring through the detected capacitance change, and a control unit connected to the detection unit and the determination unit and configured to set a driving mode according to an output of the determination unit, wherein the control unit is configured to convert the driving mode into a bending mode when is the determination unit determines that bending is occurring, and the control unit is configured to convert the driving mode into a force touch mode when is the determination unit determines that bending is not occurring.

The determination unit may be configured to detect bending coordinates at which the capacitance change is greater than a first reference capacitance change, and whether the bending coordinates form a line.

The determination unit may be configured to determine that bending is not occurring when the bending coordinates are not detected or when detected bending coordinates do not form a line.

The determination unit may be configured to detect touch coordinates at which the capacitance change is greater than a second reference capacitance change, and the second reference capacitance change may be greater than the first reference capacitance change.

The determination unit may be configured to determine a bending angle through the detected capacitance change, and may be configured to select one mode from a plurality of display modes providing different functions to the display unit in response to the determined bending angle.

The determination unit may be configured to determine a line in which the bending coordinates are connected as a bending line, and the display unit may be configured to display one mode from a plurality of display modes providing different functions to the display unit in response to a position at which the bending line is disposed.

The determination unit may include memory storing bending reference coordinates, the determination unit may be configured to detect bending coordinates at which the capacitance change is greater than a first reference capacitance change, and the determination unit may be configured to compare the bending coordinates with the bending reference coordinates.

The detection unit may include a lower electrode, an elastic layer disposed on the lower electrode, and an upper electrode disposed on the elastic layer and insulated from the lower electrode, wherein the capacitance change is a value based upon a change in capacitance between the lower electrode and the upper electrode.

The elastic layer may include any one of a magnetic fluid, a magneto-rheological fluid, and an electro-rheological fluid, and the viscosity of each of the magnetic fluid, the magneto-rheological fluid, and the electro-rheological fluid may be controlled by an electric field between the upper electrode and the lower electrode.

According to a third aspect of the invention, a method of driving a flexible display device having a touch panel includes detecting a capacitance change with respect to a coordinate of a display area of the flexible display device using an output of a sensor, determining whether bending is occurring at the coordinate through the output of the sensor; and determining whether a touch is occurring at the coordinate through the output of the sensor.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
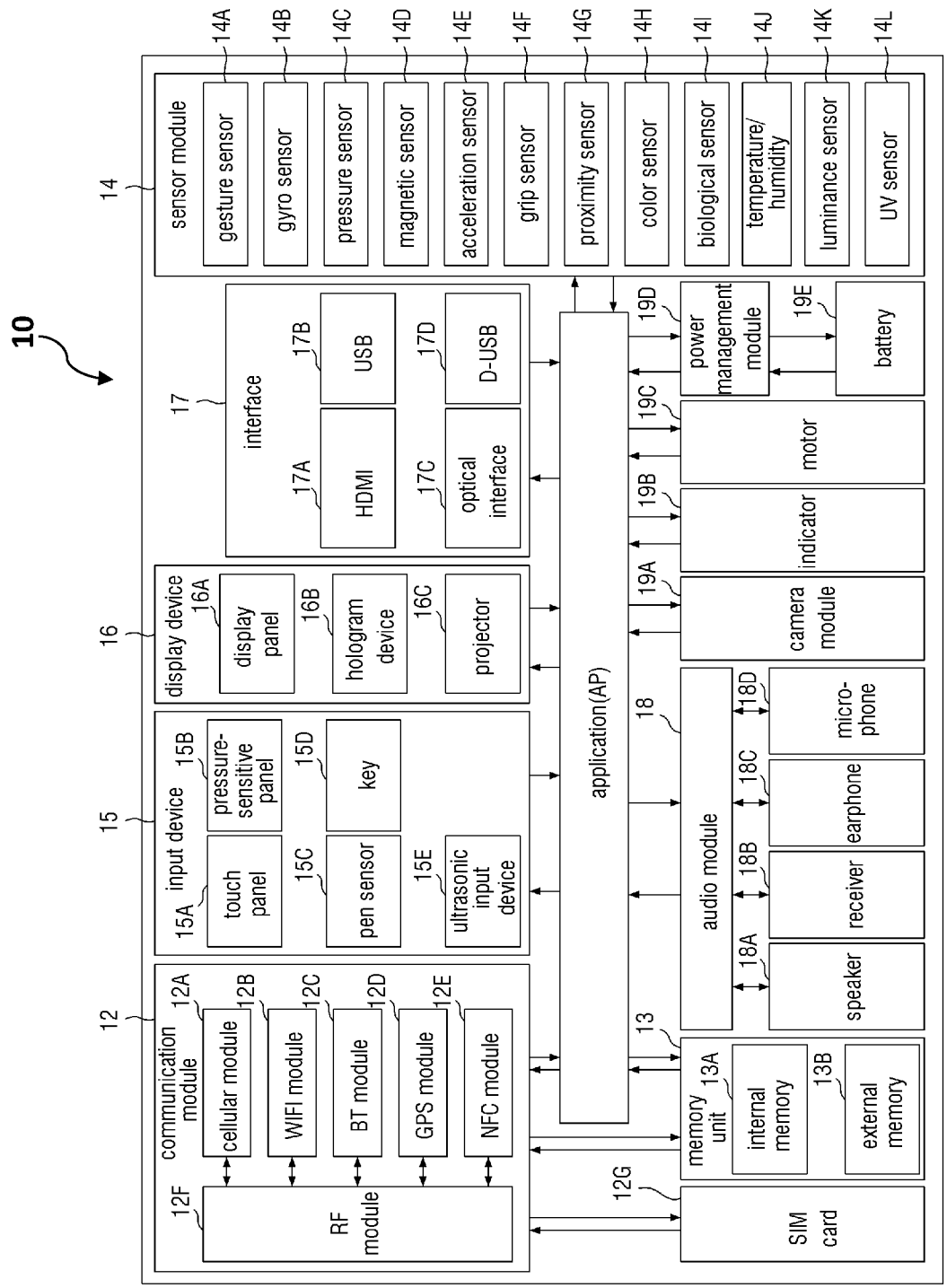
FIG. 1 is a block diagram of a first embodiment of an electronic apparatus constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Referring to FIG. 1, the electronic apparatus 10 may include one or more application processors (APs), a communication module 12, a subscriber identification module (SIM) card 12G, a memory unit 13, a sensor module 14, an input device 15, a display device 16, an interface 17, an audio module 18, a camera module 19A, an indicator 19B, a motor 19C, a power management module 19D, and a battery 19E.

The application processor (AP) may control hardware or software components connected thereto by driving an operation system or an application program, and may perform various data processing and calculation. The application processor (AP) may be embodied as SoC (system on chip). According to an embodiment, the application processor (AP) may further include a graphic processing unit (GPU) and/or an image signal processor.

The application processor (AP) may include some of the components shown in FIG. 1 (for example, cellular module 12A). The application processor (AP) may load the commands or data received from at least one of other components (for example, non-volatile memory) in volatile memory and process these commands and data, and may store various data in the non-volatile memory.

The communication module 12 may include a cellular module 12A, a WIFI module 12B, a BT module 12C, a global positioning system (GPS) module 12D, an NFC module 12E, and a RF (radio frequency) module 12F.

The memory unit 13 may include internal memory 13A and external memory 13B. Examples of the internal memory 13A may include volatile memory, such as DRAM (dynamic RAM), SRAM (static RAM), and SDRAM (synchronous dynamic RAM); non-volatile memory, such as OTPROM (one time programmable ROM), PROM (programmable ROM), EPROM (erasable and programmable ROM), EEPROM (electrically erasable and programmable ROM), mask ROM, and flash ROM; flash memory, such as NAND flash and NOR flash memories; hard drive; and solid state drive (SSD). Examples of the external memory 13B may include CF (compact flash), SD (secure digital), Micro-SD (micro secure digital), Mini-SD (mini secure digital), xD (extreme digital), and memory stick. The external memory 13B may be functionally and/or physically connected with the electronic apparatus 10 through various interfaces.

The sensor module 14 may measure physical quantity or detect the driving state of the electronic apparatus 10, and may convert the measured or detected information into electrical signals. The sensor module 14 may include at least one of a gesture sensor 14A, a gyro sensor 14B, a pressure sensor 14C, a magnetic sensor 14D, an acceleration sensor 14E, a grip sensor 14F, a proximity sensor 14G, a color sensor 14H (for example: an RGB (red, green, blue) sensor), a biological sensor 14I, a temperature/humidity sensor 14J, an luminance sensor 14K, and a UV (ultraviolet) sensor 14L. Additionally or alternatively, the sensor module 14 may further include at least one of an olfactory sensor (E-nose sensor), an electromyography (EMG) sensor, an electroencephalogram (EEG) sensor, an electrocardiogram (ECG) sensor, an infrared (IR) sensor, an iris sensor, and/or a fingerprint sensor. The sensor module 14 may further include control signals for controlling one or more sensors provided therein. The electronic apparatus 10 may further include a processor configured to control the sensor module 14 separately or as a part of the AP, so as to control the sensor module 14 while the AP is in a sleep state.

The input device 15 may include a touch panel 15A, a pressure-sensitive panel 15B, a pen sensor 15C, a key 15D, and an ultrasonic input device 15E.

The touch panel 15A may calculate the horizontal position of user's touch input. For example, the touch panel 15A may determine a position at which two electrodes cross each other as a position of input by detecting the capacitance change between the two electrodes included in the touch panel 15A. The touch panel 15A may use at least one of a resistance measuring method, a pressure-reducing method, an infrared method, and an ultrasonic method in addition to an electrostatic method. The touch panel 15A may further include a control circuit.

The pressure-sensitive panel 15B may detect the vertical pressure of user's touch input. For example, the pressure-sensitive panel 15B may detect the capacitance change depending on the change in distance between two electrodes, so as to detect the pressure corresponding to the capacitance change. The pressure-sensitive panel 15B may use a resistance measuring method and a pressure-reducing method in addition to an electrostatic method. The pressure-sensitive panel 15B may further include a control circuit.

The display device 16 may include a display panel 16A, a hologram device 16B, or a projector 16C. The display panel 16A may be embodied to be flexible, transparent and/or wearable.

The display panel 16A may be formed into one module together with the touch panel 15A. The pressure-sensitive panel 15B may also be formed into one module together with the display panel 16A. And, all of the display panel 16A, the touch panel 15A, and the pressure-sensitive panel 15B may be formed into one module.

The display device 16 may further include a control circuit for controlling the hologram device 16B or the projector 16C. However, the display device 16 may be controlled by the AP.

The interface 17 may include a high-definition multimedia interface (HDMI) 17A, a universal serial bus (USB) 17B, an optical interface 17C, or a D-subminiature (D-sub) 17D.

The audio module 18 may change sound and electrical signals in both directions. The audio module 18 may process the sound information inputted or outputted through a speaker 18A, a receiver 18B, an earphone 18C, or a microphone 18D.

The camera module 19A may be a device for capturing still and moving images. According to an embodiment, the camera module 19A may include one or more image sensors (for example: a front sensor and/or a rear sensor), a lens, an image signal processor (ISP), or a flash (for example: a LED).

The power management module 19D may manage the power of the electronic apparatus 10.

The indicator 19B may indicate a specific state, such as a booting state, a message state or a charging state, of the electronic apparatus 10 or a part thereof (for example: AP).

The motor 19C may convert electrical signals into mechanical vibration, and may cause vibration, haptic effects, and the like.

Each of the aforementioned components of the electronic apparatus 10 may be composed of one or more sub-components, and the names of the corresponding components may be varied according to the type of the electronic apparatus 10. In various embodiments, the electronic apparatus 10 may be configured to include at least one of the aforementioned components, and some of these components may be omitted or other components may be added. Some of the components of the electronic apparatus 10 according to various embodiments may be coupled to form a single object (entity), thereby jointly performing the functions individually performed by the corresponding components before coupling.

Figure 2:
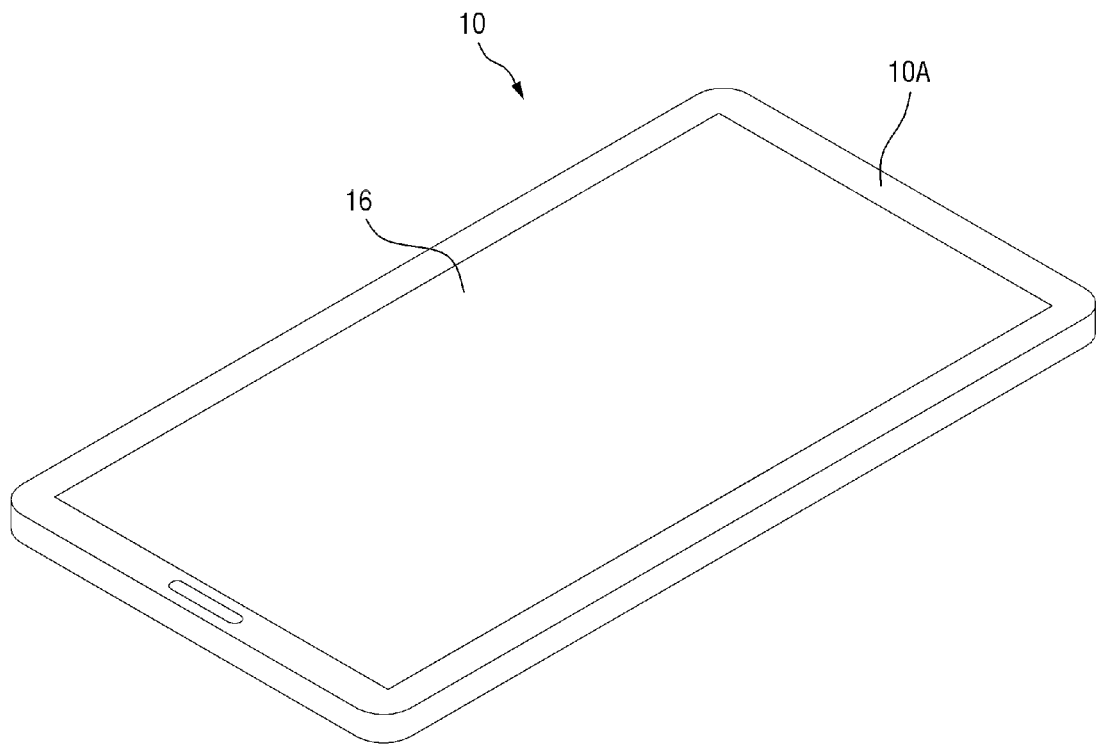
FIG. 2 is a perspective view of the electronic apparatus of FIG. 1.

Referring to FIG. 2, the electronic apparatus 10 may include a housing member 10A and a display device 16. The front surface of the housing member 10A may be opened, and the opened front surface of the housing member 10A may be closed by mounting the display device 16. The electronic apparatus 10 may be provided with a key pad including buttons or touch keys mechanically actuating from the front surface of the housing member 10A to one side of the display device 16.

The housing member 10A may accommodate various circuit devices, for example, the aforementioned AP, input device 15, communication module 12, audio module 18 and the like.

Figure 3:
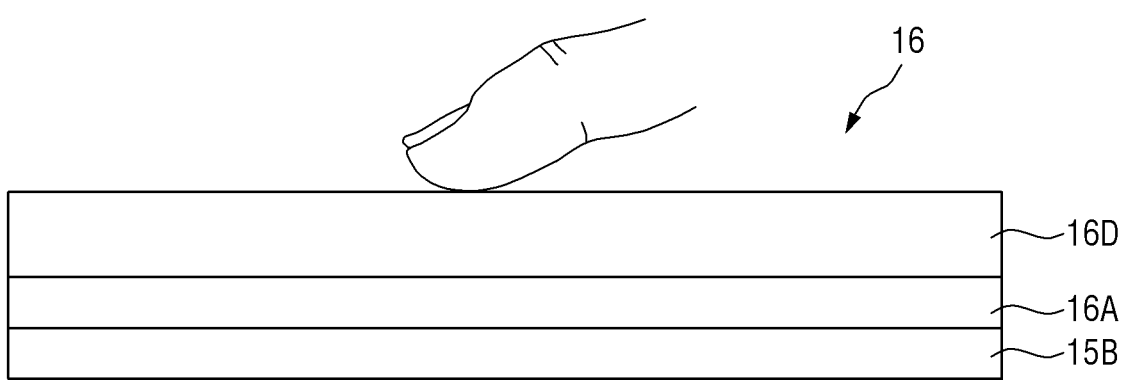
FIG. 3 is an side sectional view of the electronic apparatus of FIG. 1 constructed according to the principles of the invention.
Figure 4:
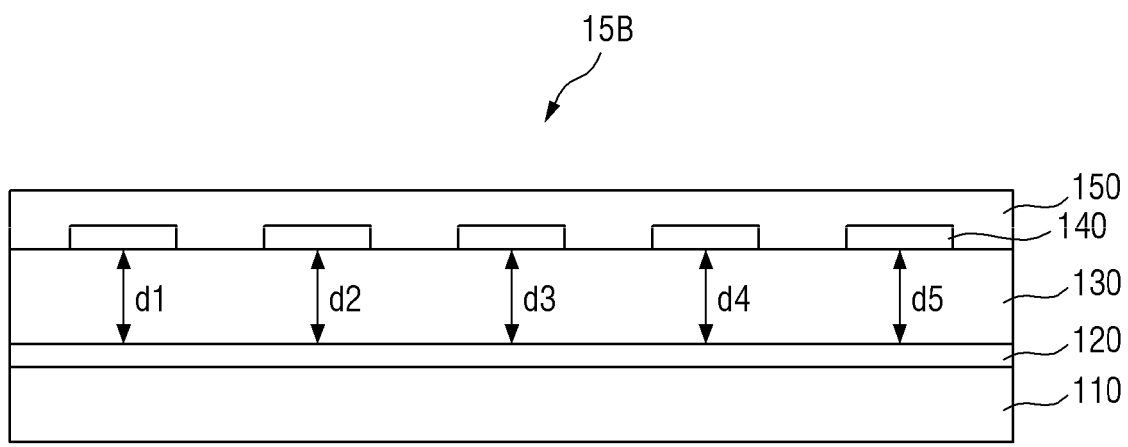
FIG. 4 is a side sectional view of a first embodiment of a pressure-sensitive panel in the electronic apparatus of FIG. 3.

Referring to FIGS. 3 and 4, the electronic apparatus 10 may include a touch panel 15A and a pressure-sensitive panel 15B, which may be laminated in the display device 16, thereby realizing a three-dimensional input. For example, the position of touch input may be calculated through the touch panel 15A integrated with the display device 16, and the pressure caused by touch input may be calculated into digital values through the pressure-sensitive panel 15B, so as to detect three-dimensional coordinates from the calculated position of touch input and the calculated digital values corresponding to the pressure caused by touch input.

The display device 16 may include a display panel 16A outputting an image and a window 16D disposed on the front surface of the display panel 16A. The display device 16 may further include a pressure-sensitive panel 15B disposed on the rear surface of the display panel 16A. The touch panel 15A may be integrated with the display panel 16A to be formed in the display panel 16A. The touch panel 15A may also be disposed between the window 16D and the display panel 16A.

The window 16D may be disposed on the front surface of the display panel 16A. This may protect the display device 16 from damage caused by an external impact.

The display device may include the touch panel 15A integrated with the display panel 16A, so as to be used as an input device as well as an output device. The touch panel 15A may be an electrostatic touch panel made of an indium-tin oxide (ITO) film. When the user's body comes into contact with the touch panel 15A or approaches the touch panel 15A, the touch panel 15A may detect the capacitance change and detect coordinates at which the user contacts or approaches the touch panel 15A. Herein, the term "plane coordinate" refers to a coordinate representing a position on the front surface of the display panel 16A.

The pressure-sensitive panel 15B may be laminated on the rear surface of the display panel 16A. The pressure-sensitive panel 15B may be disposed and laminated on a surface facing the touch panel 15A based on the display panel 16A.

The pressure-sensitive panel 15B may be disposed to face an upper electrode 140 and a lower electrode 120 with an insulating elastic layer 130 placed there between, so as to have (a) touch portion(s) having the same structure as a capacitive element.

Specifically, the pressure-sensitive panel 15B may include a lower substrate 110, the lower electrode 120, the elastic layer 130, the upper electrode 140, and an upper substrate 150, which may be laminated.

The lower substrate 110 and the upper substrate 150 may maintain the shape of the pressure-sensitive panel 15B, and may protect the internal components of the pressure-sensitive panel 15B from external impact. The lower substrate 110 and the upper substrate 150 may be made of a bendable material. Particularly, the upper substrate 150 may have a lower rigidity than the lower substrate 110 such that the upper substrate 150 may be bent by a pressure applied from the outside which would be insufficient to bend the lower substrate 110.

The lower substrate 110 and the upper substrate 150 may be made of a conductive metal.

The elastic layer 130 may contain silicon and a polymer. The polymer may be any one of polyimide and polyurethane. However, the material of the elastic layer 130 is not limited thereto, and various materials may be used as the material of the elastic layer 130 which may have elasticity restoring it to its original shape when an applied pressure is removed, and may include one or more insulating materials electrically insulating the upper electrode 140 and the lower electrode 120.

The elastic layer may be made of smart fluid as well as of silicon and polymer. A detailed description of embodiments of the elastic layer 130 being made of a smart fluid will be described later.

Meanwhile, when the user's body comes into contact with the display device 16, the pressure-sensitive panel 15B may detect the pressure caused by the contact with the user's body from a capacitance change corresponding to a change in distance between the upper electrode 140 and the lower electrode 120. However, contact with the user's body is used as an example of the pressure applied to the pressure-sensitive panel 15B, but the principles of the invention are not limited to such contact but may include contact from other objects. For example, pressure may be applied to the pressure-sensitive panel 15B by a stylus pen, and the material of the stylus pen may be conductive or non-conductive. The pressure generated by any material having enough rigidity to apply a certain amount of pressure to the pressure-sensitive panel 15B may be detected by the pressure-sensitive panel 15B.

When the user's touch pressure is not applied to the pressure-sensitive panel 15B, the distances (d1, d2, d3, d4, and/or d5) between the lower electrode 120 and the upper electrode 140 may be maintained at or near a constant value or values. However, when the user's touch pressure is applied to the pressure-sensitive panel 15B, the distance between the lower electrode 120 and the upper electrode 140 decreases, and thus the capacitance between the lower electrode 120 and the upper electrode 140 increases. Therefore, the pressure change may be detected by analyzing the magnitude of this capacitance change.

Further, whether or not the display device 16 is bent, moreover, whether or not the electronic apparatus 10 is bent, may be determined using the touch panel 15A and the pressure-sensitive panel 15B as well as the contact of user's body with the display device 16.

Several exemplary methods of determining whether the display device 16 is bent using the touch panel 15A and the pressure-sensitive panel 15B will be described in detail later. These methods refer to exemplary structure shown in FIGS. 5 and 6.

Figure 5:
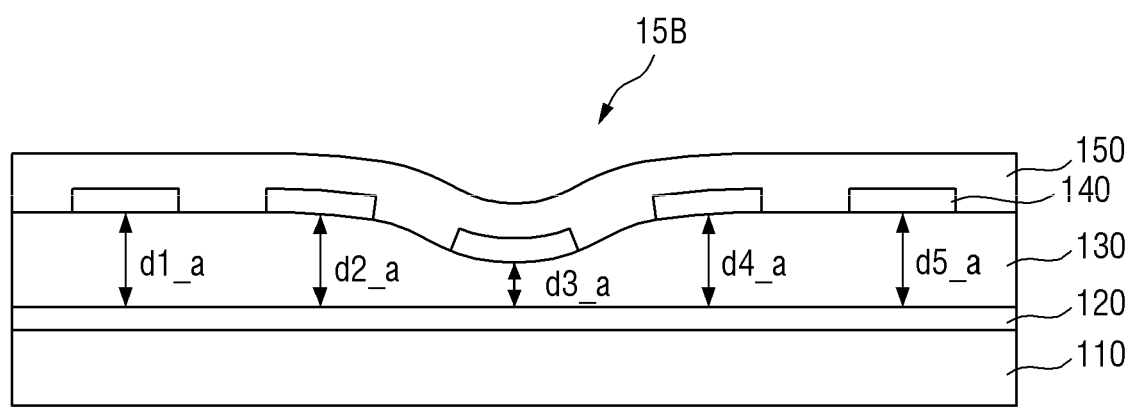
FIG. 5 is a side sectional view of the pressure-sensitive panel of FIG. 4 when a user's touch input is applied to a display device including the pressure-sensitive panel.

Referring to FIG. 5, when the user's touch input is applied to the display device 16, intensive pressure may be applied to the narrow area of the front surface of the pressure-sensitive panel 15B. For example, as shown in FIG. 5, when the user's touch input is applied to the central area of the pressure-sensitive panel 15B, the third distance d3_a disposed in the central area of the pressure-sensitive panel 15B, which may be a distance between the upper electrode 140 and lower electrode 120, becomes shorter than the second distance d2_a and fourth distance d4_a adjacent to the third distance d3_a, each of which may be a distance between the upper electrode 140 and lower electrode 120. In this case, the second distance d2_a and the fourth distance d4_a may also be changed, but the changes thereof may not be as large as the change of the second distance d2 and fourth distance d4 shown in FIG. 4 because intensive pressure is applied to the central area of the pressure-sensitive panel 15B in FIG. 5. Further, the first distance d1_a and the fifth distance d5_a may be equal in FIG. 5 to the first distance d1 and fifth distance d5 shown in FIG. 4.

Figure 6:
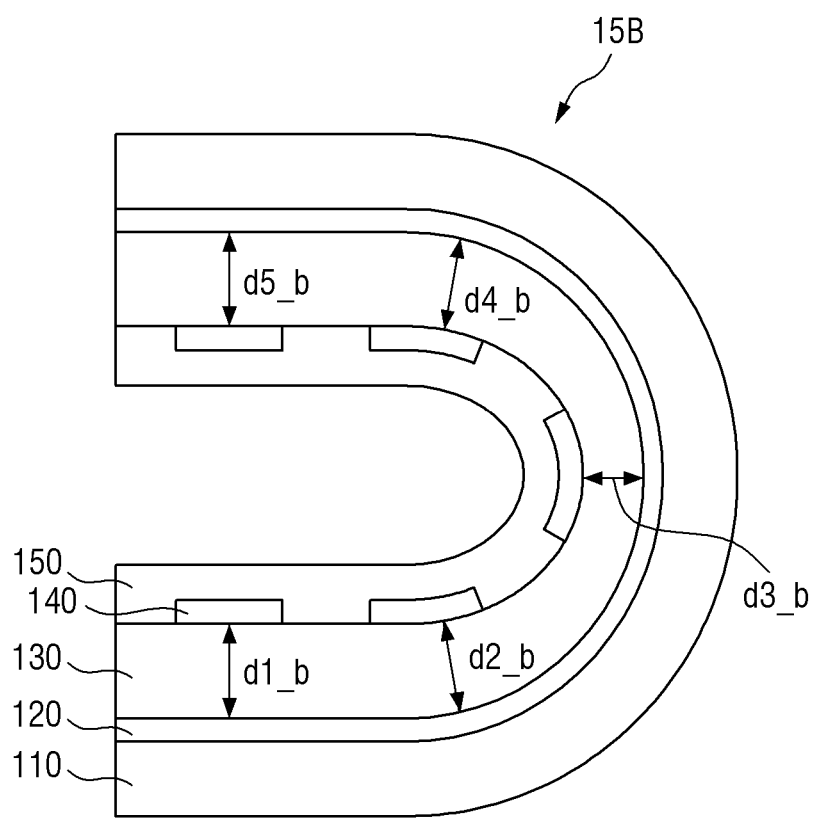
FIG. 6 is a side sectional view of the pressure-sensitive panel of FIG. 5 when the display device is bent.

In contrast, referring to FIG. 6, when the display device 16 is bent, pressure may be applied over the relatively large area of the pressure-sensitive panel 15B. For example, as shown in FIG. 6, when the display device 16 is bent based on the center of the pressure-sensitive panel 15B, the third distance d3_b disposed in the central area of the pressure-sensitive panel 15B, which may be a distance between the upper electrode 140 and lower electrode 120, decreases, and the second distance d2_b and fourth distance d4_b adjacent to the third distance d3_b, each of which may be a distance between the upper electrode 140 and lower electrode 120, also decrease.

However, compared to when the user's touch input is applied, the change of the third distance d3_b may be relatively small while the changes of the second distance d2_b and the fourth distance d4_b may be more significantly larger in FIG. 6. Thus, comparing the pressure-sensitive panel 15B which may be bent as shown in FIG. 6 with the pressure-sensitive panel 15B to which the user's touch input may be applied as shown in FIG. 5, the third distance d3_b may be larger in FIG. 6 than in FIG. 5 while the second distance d2_b and the fourth distance d4_b may be shorter in FIG. 6 than in FIG. 5.

If the distance change, as shown in FIG. 6, occurs while forming one straight line disposed on the front surface of the display device 16, it can be determined that this distance change is a distance change caused by the bending of the display device 16, not by the user's touch input. Here, the "bending line (BL)" refers to an area in which a straight line is disposed when the change in distance between the upper electrode 140 and the lower electrode 120 is detected over the entire area overlapping the straight line connecting both ends of the front surface of the display device 16. However, the invention is not limited thereto. When the length of the line connecting the coordinates, at which distance change occurs, is longer than a given length, it may be determined that this line is referred to as bending line (BL) even if that is less than the entire dimension of the display device 16.

As the distance between the upper electrode 140 and the lower electrode 120 decreases, the capacitance between the upper electrode 140 and the lower electrode 120 increases. Therefore, when this phenomenon is detected and analyzed as described above, it can be determined whether the capacitance change is caused by the user's touch input or the bending of the display device 16. Thus, the bending of the display device 16 can be detected without an additional sensor for detecting the bending thereof. And, accordingly, the cost of manufacturing the apparatus may be reduced as compared to an apparatus that uses a separate sensor to detect bending of the display device 16.

The method of detecting whether the capacitance change is caused by the user's touch input or the bending of the display device 16 will now be described in more detail with reference to FIGS. 7 and 8.

Figure 7:
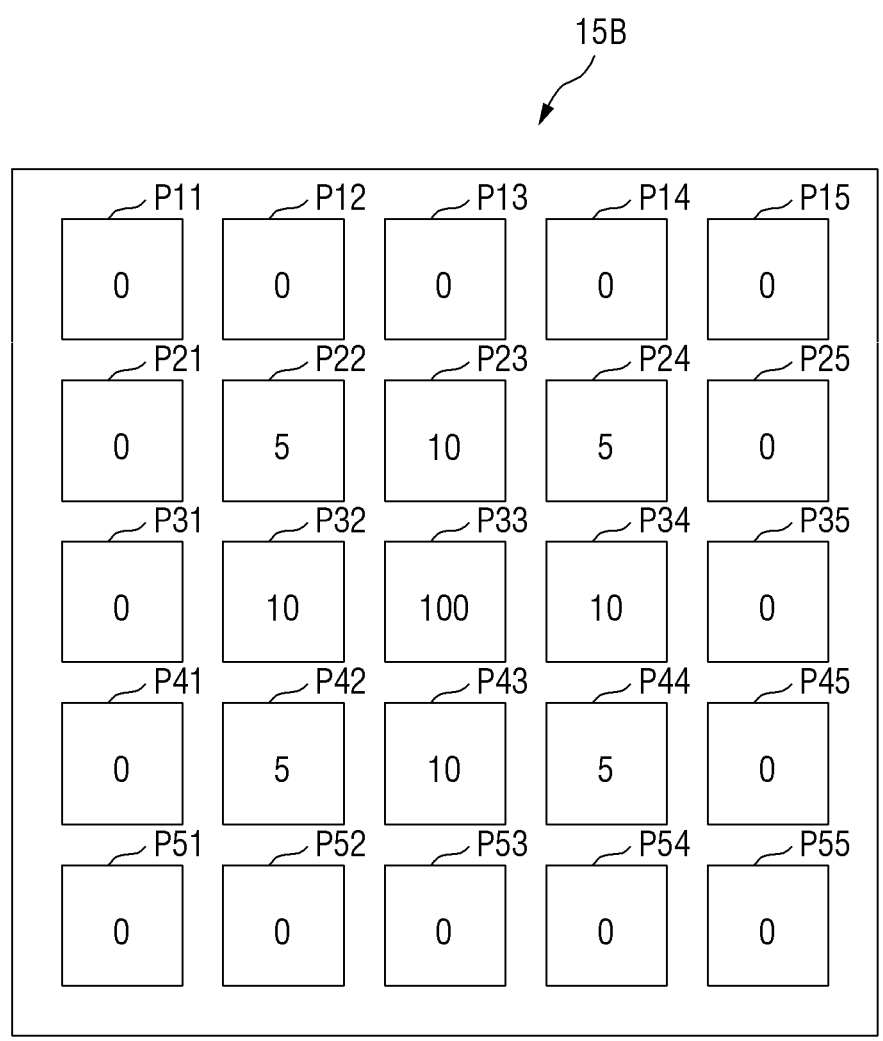
FIG. 7 is a schematic diagram illustrating an exemplary capacitance change with respect to each coordinate of the pressure-sensitive panel of FIG. 5 when the user's touch input is applied to the display device.
Figure 8:
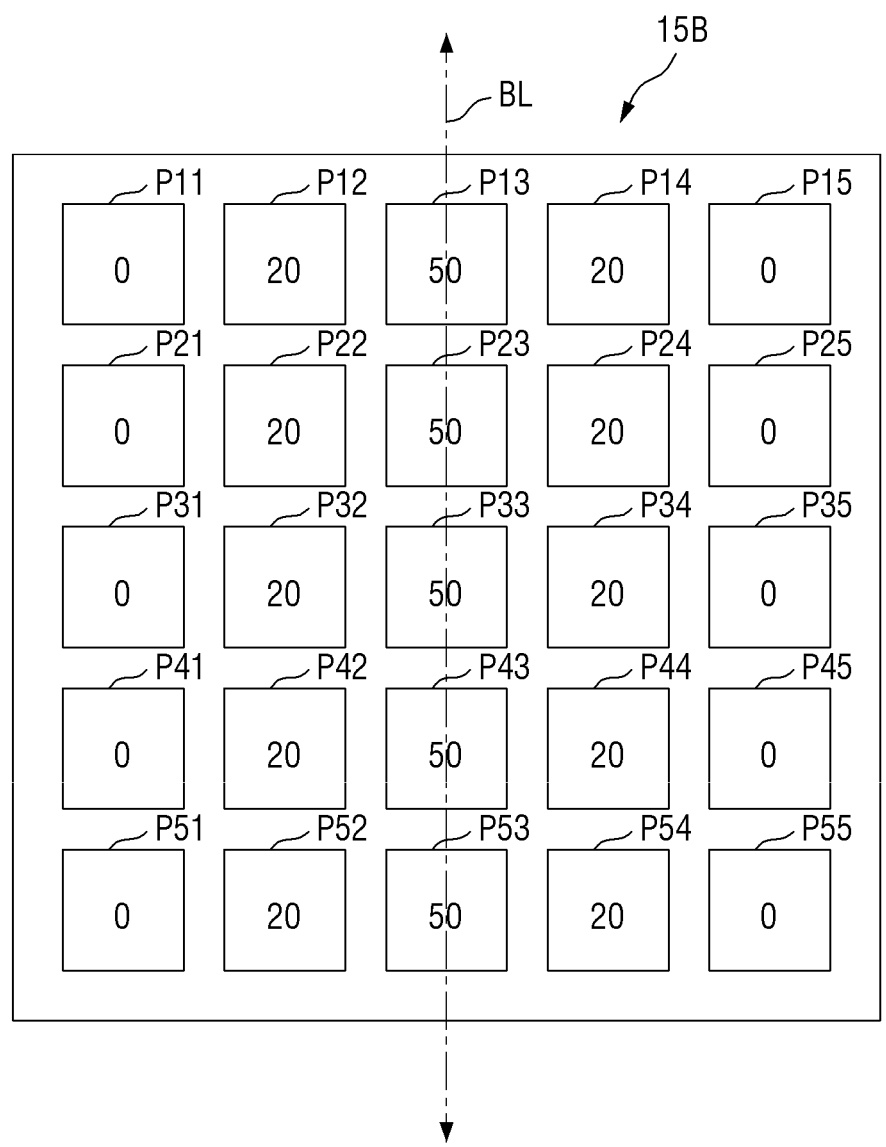
FIG. 8 is a schematic diagram illustrating an exemplary capacitance change with respect to each coordinate of the pressure-sensitive panel of FIG. 6 when the display device is bent in a first configuration.

Each of the schematic diagrams of FIGS. 7 and 8 corresponds to the front surface of the pressure-sensitive panel 15B, and, for the convenience of explanation, the coordinates of the front surface of the pressure-sensitive panel 15B may be represented by a matrix area of 5 rows and 5 columns (P11~P55). However, the invention is not limited thereto, and the coordinates on the pressure-sensitive panel 15B may also be set by dividing the area into small areas of a larger number of rows and columns. Further, even when only the pressure change is measured by the pressure-sensitive panel 15B, as described above, the coordinates of the position, at which pressure change occurs, can still be found.

The numerical value within the block for each of the coordinates shown in FIGS. 7 and 8 refers to a capacitance change measured at that coordinate. The capacitance change may be measured by a digital value, but may also be defined by various analog or other methods.

The embodiment shown in FIG. 7 illustrates a case where the user's touch input is applied to the coordinate (P33) of third row and third column, and an exemplary capacitance change, which occurs when the user's touch input is applied, will be defined by 100. The following capacitance changes may be set based on the capacitance change in this embodiment, and might have no unit because they may be arbitrary digital values.

In this case, a large capacitance change of 100 may be observed at the coordinate (P33) of third row and third column, but a small capacitance change of 5 to 10 may be observed at the coordinates (P22~P24) of second row and second column to second row and fourth column, the coordinate (P32) of third row and second column, the coordinate (P34) of third row and fourth column, and the coordinates ((P42~P44) of fourth row and second column to fourth row and fourth column, which may be adjacent to the coordinate (P33) of third row and third column.

In the determination of the pressure caused by the user's touch input, when the capacitance change does not reach a predetermined value, that circumstance may be determined to be noise. The noise may be generated by the unintended light touch of user, the slight change of external environment, the error of signal transfer and so on. Here, the capacitance change determining whether the pressure is caused by the user's touch input may be a second reference capacitance change, and, for example, may have a value of 60. That is, if a capacitance change of 60 or more occurs at any coordinate of the pressure-sensitive panel 15B, it may be determined that the user's touch input having a component in a direction perpendicular to the front surface of the pressure-sensitive panel 15B is applied to the corresponding coordinate. Here, in the pressure-sensitive panel 15B, the touch coordinate may be defined as a coordinate at which a capacitance change equal to or greater than the second reference capacitance change is detected.

In contrast, the embodiment shown in FIG. 8 illustrates a case where the display device 16 is bent along the coordinates (P13, P23, P33, P43, and P53) of the third column.

In this case, a capacitance change of about 50 may be observed over the coordinates of third column (P13, P23, P33, P43, and P53). However, since this capacitance change is less than 60, which is an exemplary value of the aforementioned second reference capacitance change, it might not be determined that the user's touch input is applied.

However, as the reference for determining whether bending occurs, a capacitance change of 30 might be defined as a first reference capacitance change. In the pressure-sensitive panel 15B, the coordinate at which a capacitance change equal to or greater than the first reference capacitance change is detected, may be defined as a bending coordinate.

In this embodiment, it can be ascertained that the bending coordinate may be detected while forming a bending line BL along the coordinates (P13, P23, P33, P43, and P53) of the third column. That is, the bending line BL may be disposed to overlap the coordinates (P13, P23, P33, P43, and P53) of the third column. Thus, since the condition that the capacitance change exceeds the first reference capacitance change is satisfied and the condition is also satisfied that the capacitance change formed along the bending line BL over the front surface of the pressure-sensitive panel 15B exists, it may be determined that the display device 16 is bent along the coordinates (P13, P23, P33, P43, and P53) of the third column.

Whether a position at which the capacitance change is detected forms the bending line BL may be an important factor for determining whether bending occurs.

Figure 9:
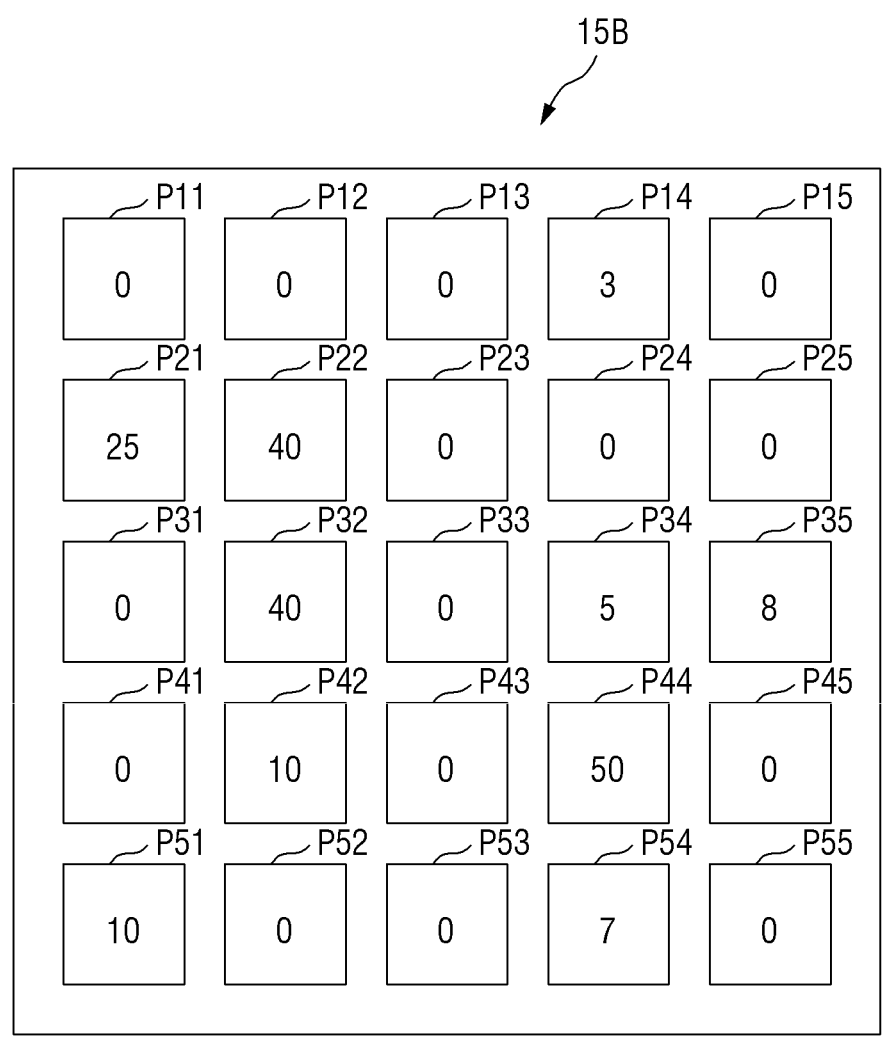
FIG. 9 is a schematic diagram illustrating an exemplary capacitance change with respect to each coordinate of the pressure-sensitive panel of FIG. 4 when only noise is generated in the display device.

Additional details be further described with reference to FIG. 9, as a comparative embodiment.

In this comparative embodiment, it may be that the first reference capacitance change, which may be a factor for determining whether bending occurs, has a value of 30, and it may be assumed that the second reference capacitance change, which may be a factor for determining whether the user's touch input is applied, has a value of 60.

First, the capacitance change exceeding the first reference capacitance change may be measured at the coordinate (P22) of second row and second column, at the coordinate (P32) of third row and second column, and at the coordinate (P44) of fourth row and fourth column. However, since the capacitance change is not measured over all of any given row or column, a determination may thereby be made that the positions at which these capacitance changes occur do not form a bending line BL. Therefore, it may be determined that the display device 16 is not in a bent state.

Further, since the capacitance change exceeding the second reference capacitance change is not observed at any coordinate in this example, it may be determined that the user's touch input is not applied. Where some coordinates exceed at least the first reference capacitance but no determination may be made of either a user's touch input or a bent state, it may be determined that the capacitance changes occurring at all the coordinates in the pressure-sensitive panel 15B are noise.

Therefore, based on the aforementioned criteria, whether the display device 16, moreover, the electronic apparatus 10 including the display device 16 is bent may be determined without using an additional sensor for detecting the bending of the display device 16 separately from detecting a user's touch.

Next, an exemplary method of determining whether the electronic apparatus 10 is bent will be described in detail with reference to FIGS. 10 and 11.

Figure 10:
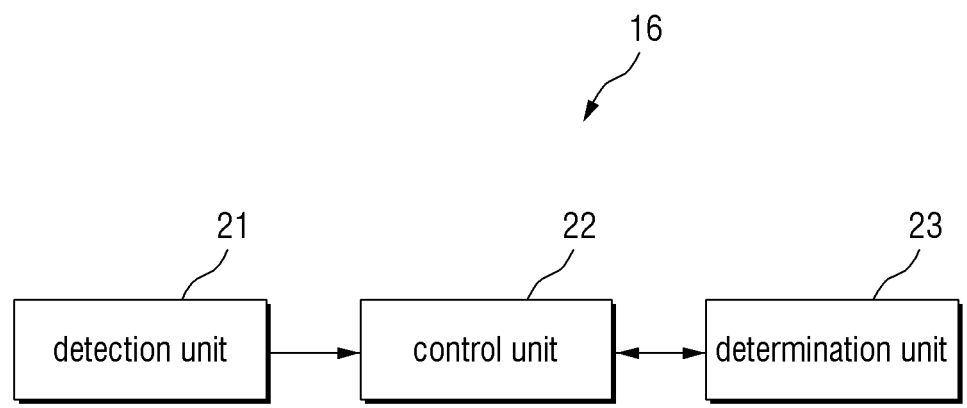
FIG. 10 is a block diagram of an electronic apparatus constructed according to the principles of the invention.

Referring to FIG. 10, the display device 16 according to this embodiment may be provided in the aforementioned electronic apparatus 10, and may include a detection unit 21, a control unit 22, and a determination unit 23. Here, the display device 16, as described above, may be a flexible display device 16 that can be bent.

The detection unit 21 may include a touch panel 15A and a pressure-sensitive panel 15B. The detection unit 21 may detect the three-dimensional pressure applied to the display device using the touch panel 15A and the pressure-sensitive panel 15B.

Specifically, the detection unit may detect the capacitance change occurring in the pressure-sensitive panel 15B and the coordinate at which the capacitance change occurs using the touch panel 15A and the pressure-sensitive panel 15B. The information about the capacitance change and coordinate detected by the detection unit 21 may be transferred to the determination unit 23 through the control unit 22. The signal transferred from the detection unit 21 to the determination unit 23 through the control unit 22 may be a digital signal. The method of transferring the signal is not limited as long as it can transfer the information about the capacitance change.

The determination unit 23 may determine whether user's touch input is applied or whether the display device 16 or the electronic apparatus 10 including the same is bent, based on the information detected from the detection unit 21 and provided through the control unit 22. The determination unit 23 may provide the results of determining whether the user's touch input is applied or whether the display device 16 or the electronic apparatus 10 including the same is bent, to the control unit 22. The signal transferred from the determination unit 23 to the control unit 22 may be a digital signal. The method of transferring the signal is not limited as long as it can transfer the information about whether user's touch input is applied or whether the display device 16 or the electronic apparatus 10 including the same is bent.

The control unit 22 may provide the signal transferred from the detection unit 21 to the determination unit 23, may determine the driving mode of the electronic apparatus 10 on the basis of the signal provided from the determination unit 23, and may transfer the related information to each component of the electronic apparatus 10. The driving mode may include a force touch mode and/or a bending mode.

The force touch mode may be a mode which is driven when the bending of the display device 16 or the electronic apparatus 10 including the same is not detected although the user's touch input is applied. In this case, information about the user's touch input may be provided to other components of the electronic apparatus 10. The information about the user's touch input may include information about vertical pressure of the user's touch input as well as a horizontal coordinate of the user's touch input. That is, the information about the user's touch input may include information about a coordinate on Z-axis perpendicular to X-axis and Y-axis as well as one or more coordinates on X-axis and Y-axis. Each component of the electronic apparatus 10 may be controlled accordingly.

The bending mode may be a mode which is driven when the bending of the display device 16 or the electronic apparatus 10 including the same is detected. In this case, information about the bending of the display device 16 or the electronic apparatus 10 including the same may be provided to other components of the electronic apparatus 10. Each component of the electronic apparatus 10 may be controlled accordingly.

The control unit 22 and the determination unit 23 may be separately mounted in the touch panel 15A and the pressure-sensitive panel 15B, for example, in the form of an integrated circuit, and may be mounted in an integrated circuit controlling the touch panel 15A and the pressure-sensitive panel 15B. Moreover, the control unit 22 and the determination unit 23 may also be mounted in the AP of the electronic apparatus 10.

Figure 11:
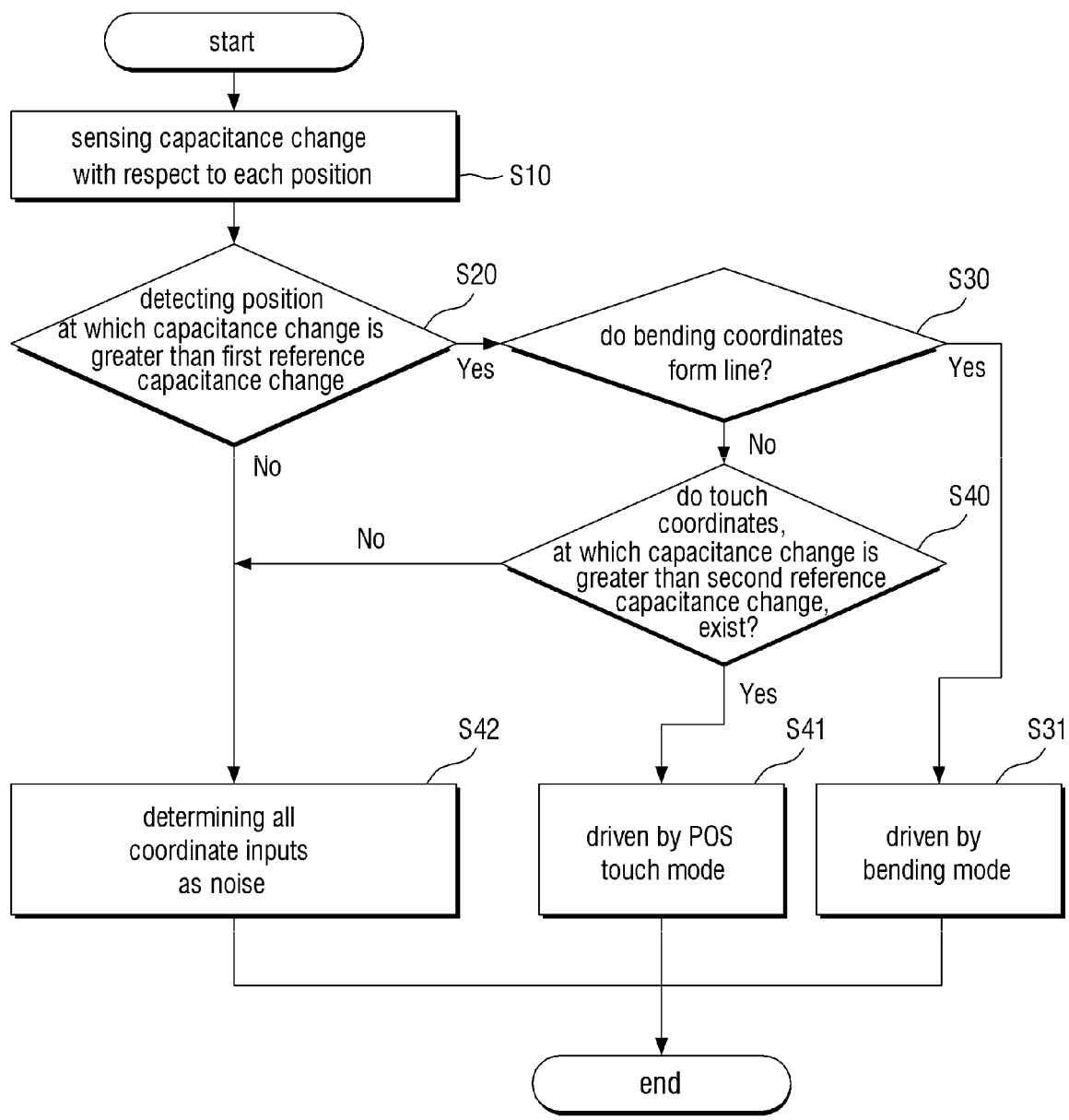
FIG. 11 is a flowchart illustrating a first exemplary method of driving a display device according to the principles of the invention.

Referring to FIG. 11, an exemplary method of driving a display device according to an embodiment of the invention may include the steps of detecting a capacitance change with respect to each position (S10), detecting the bending coordinates at which a capacitance change is greater than the first reference capacitance change (S20), determining whether a bending line BL formed by connecting the detected coordinates to each other exists (S30), and determining whether the touch coordinates at which the capacitance change is greater than the second reference capacitance change exist (S40).

In the step of detecting the bending coordinates at which the capacitance change is greater than the first reference capacitance change (S20), when the bending coordinates are detected, whether the bending coordinates form the bending line BL may be additionally determined (S30). When the bending coordinates form the bending line BL, the display device 16 is driven by the bending mode (S31).

In the step of detecting the bending coordinates at which the capacitance change is greater than the first reference capacitance change (S20), when the bending coordinates are not detected, pressure at all the coordinates is determined as noise (S42).

In the step of determining whether the bending coordinates form the bending line BL (S30), when it is determined that the bending coordinates do not form the bending line BL, it may be determined whether the touch coordinates at which the capacitance change is greater than the second reference capacitance change exist (S40).

When it is determined that the touch coordinates exist, the display device 16 may be driven by the force touch mode while assuming that the user's touch input exists in the area corresponding to the touch coordinates (S41).

When it is determined that the touch coordinates do not exist, similarly to the case when the bending coordinates are not detected, pressure at all the coordinates may be determined as noise (S42).

Through the aforementioned steps, whether the display device 16 and the electronic apparatus 10 including the same are bent may be determined without additional structure for detecting the bending of the display device 16 and the electronic apparatus 10 including the same.

Figure 12:
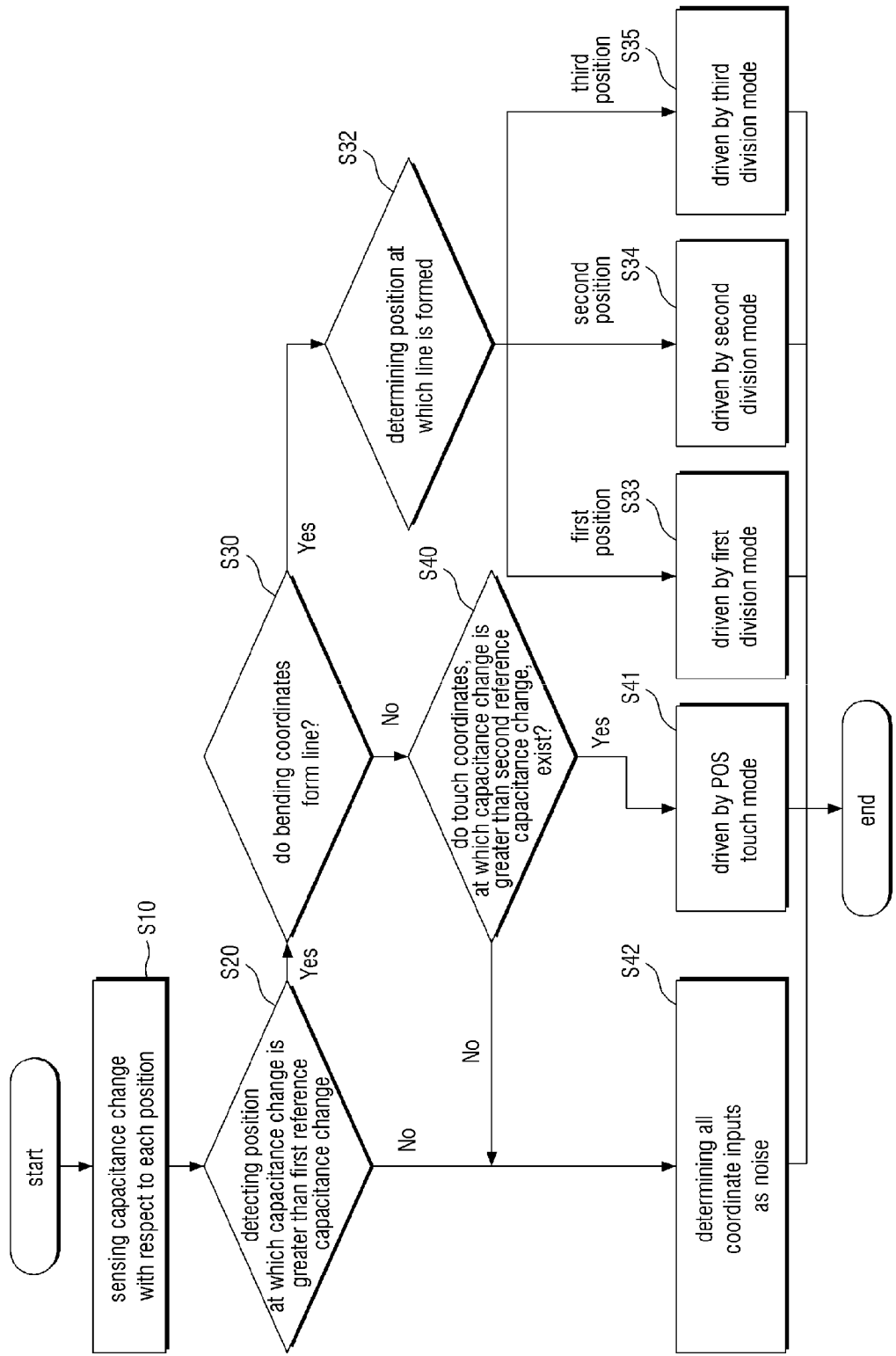
FIG. 12 is a flowchart illustrating a second exemplary method of driving a display device according to the principles of the invention.

Referring to FIG. 12, the method of driving a display device according to this embodiment is different from the method of driving a display device according to the embodiment shown in FIG. 11 in that this method further includes the step of determining a position at which the bending coordinates form the bending line BL (S32). Therefore, hereinafter, redundant descriptions will be omitted, and differences will be mainly described.

The method of driving a display device according to the embodiment of FIG. 12, compared to the method of driving a display device according to the embodiment of FIG. 11, further includes the step of determining a position, at which the bending line BL is formed on the pressure-sensitive panel 15B (S32) when it is determined that the bending coordinates form the bending line BL (S30). The bending line BL may have a large number of specific locations because it may be, for example, any possible straight line disposed on the front surface of the pressure-sensitive panel 15B. The display device 16 according to this embodiment may thus determine a position at which the bending line BL is formed, so as to be driven by a first division mode (S33), be driven by a second division mode (S34), or be driven by a third division mode (S35), on the basis of the determined position of the bending line BL.

The first division mode, the second division mode, and the third division mode are a few examples of the bending mode. The driving of the display device 16 is not limited to the first division mode, the second division mode, and the third division mode. The display device 16 may be driven by a larger number of division modes, and may also be driven by a smaller number of division modes.

An exemplary method of determining a position at which the bending line BL is formed by the bending coordinates will now be described in more detail.

Figure 13:
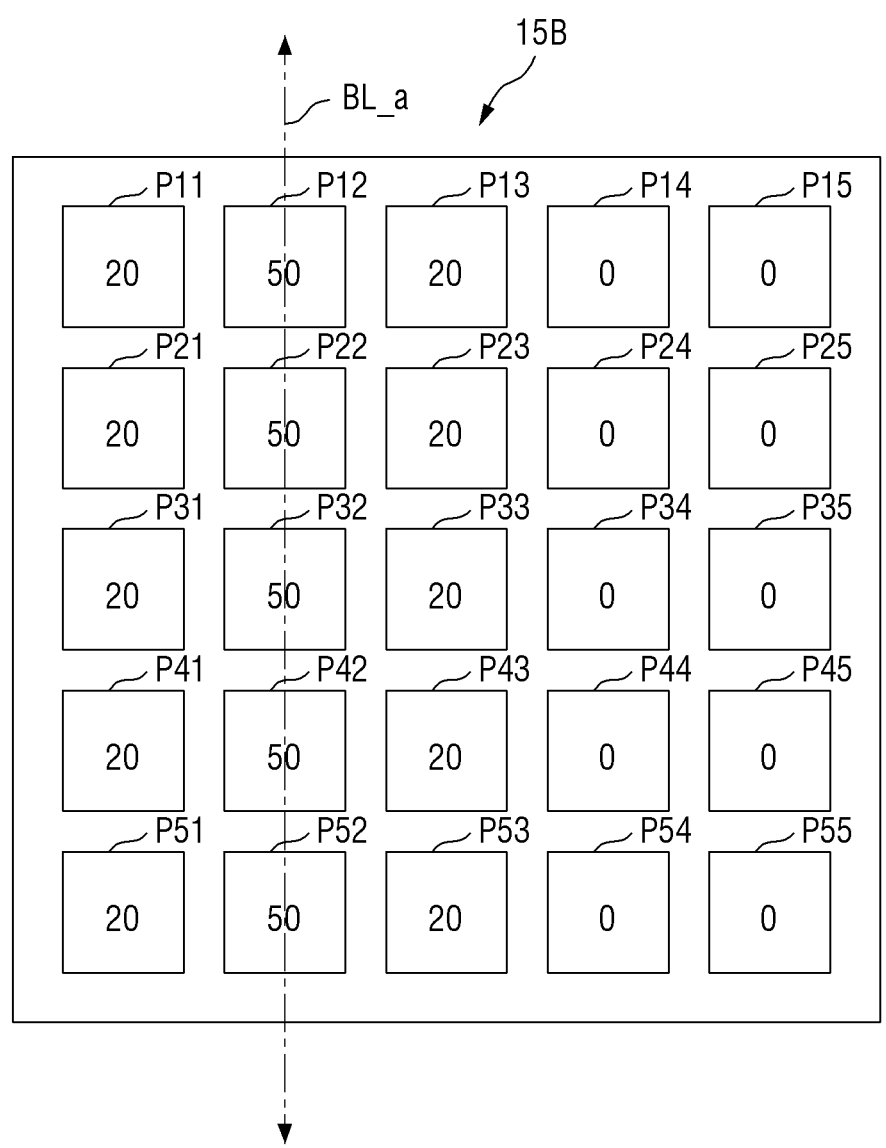
FIGS. 13 to 15 are schematic diagrams illustrating exemplary capacitance changes with respect to each coordinate of the pressure-sensitive panel of FIG. 6 when the display device is bent in the second, third and fourth configurations.

In the embodiment according to FIG. 13, a bending line BL_a may be disposed along the coordinates (P12, P22, P32, P42, and P52) of the second column. That is, consistent with the description above in connection with the embodiment of FIG. 8, since the bending line BL_a is disposed along the coordinates (P12, P22, P32, P42, and P52) of the second column, not along the coordinates (P13, P23, P33, P43, and P53) of the third column as with the embodiment of FIG. 8, it can be ascertained that the display device 16 and the electronic apparatus 10 including the same are bent along the coordinates (P12, P22, P32, P42, and P52) of the second column of the pressure-sensitive panel 15B.

Figure 14:
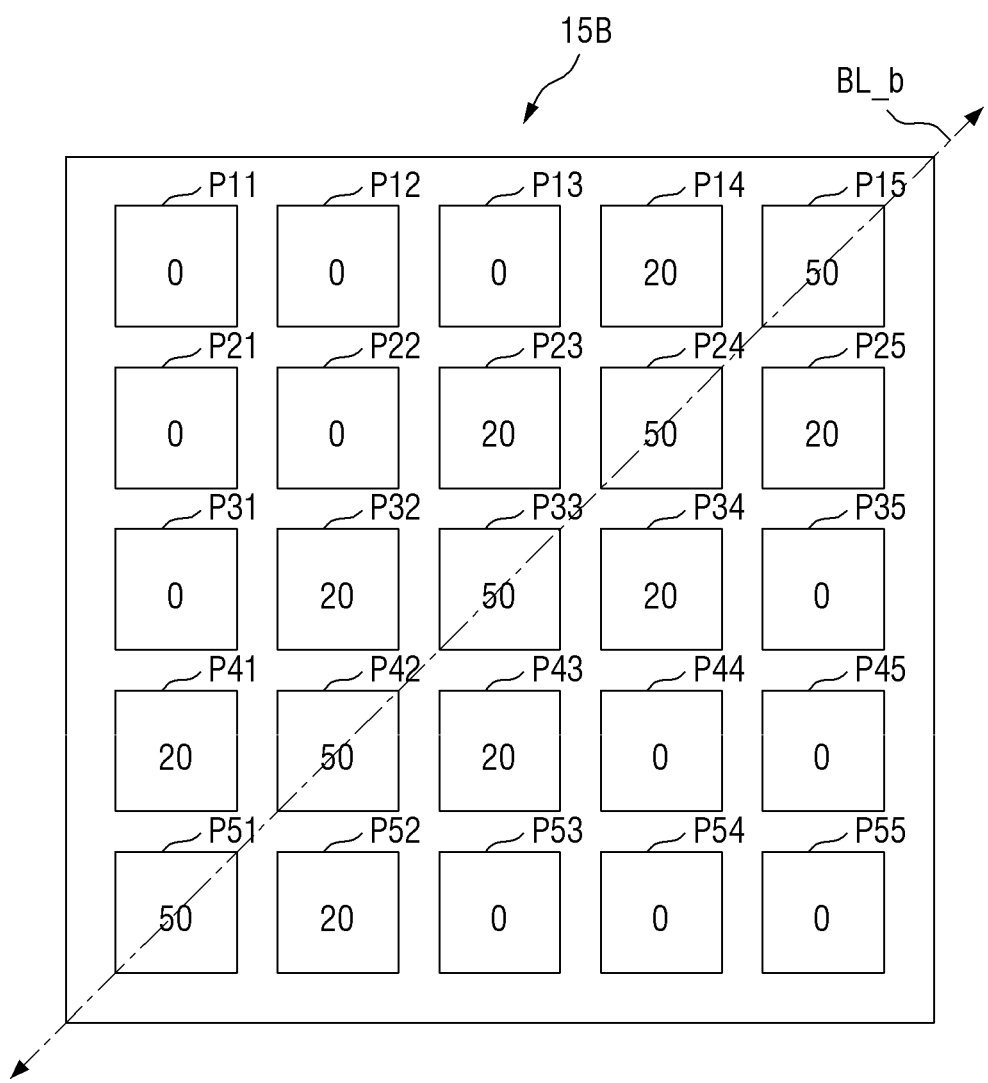

In the embodiment according to FIG. 14, a bending line BL_b may be disposed traversing the pressure-sensitive panel 15B along a diagonal line. That is, unlike the embodiments according to FIGS. 8 and 13, since bending line BL_b diagonally crosses the pressure-sensitive panel 15B, it can be ascertained that the display device 16 and the electronic apparatus 10 including the same are bent along the diagonal line crossing the pressure-sensitive panel 15B.

Figure 15:
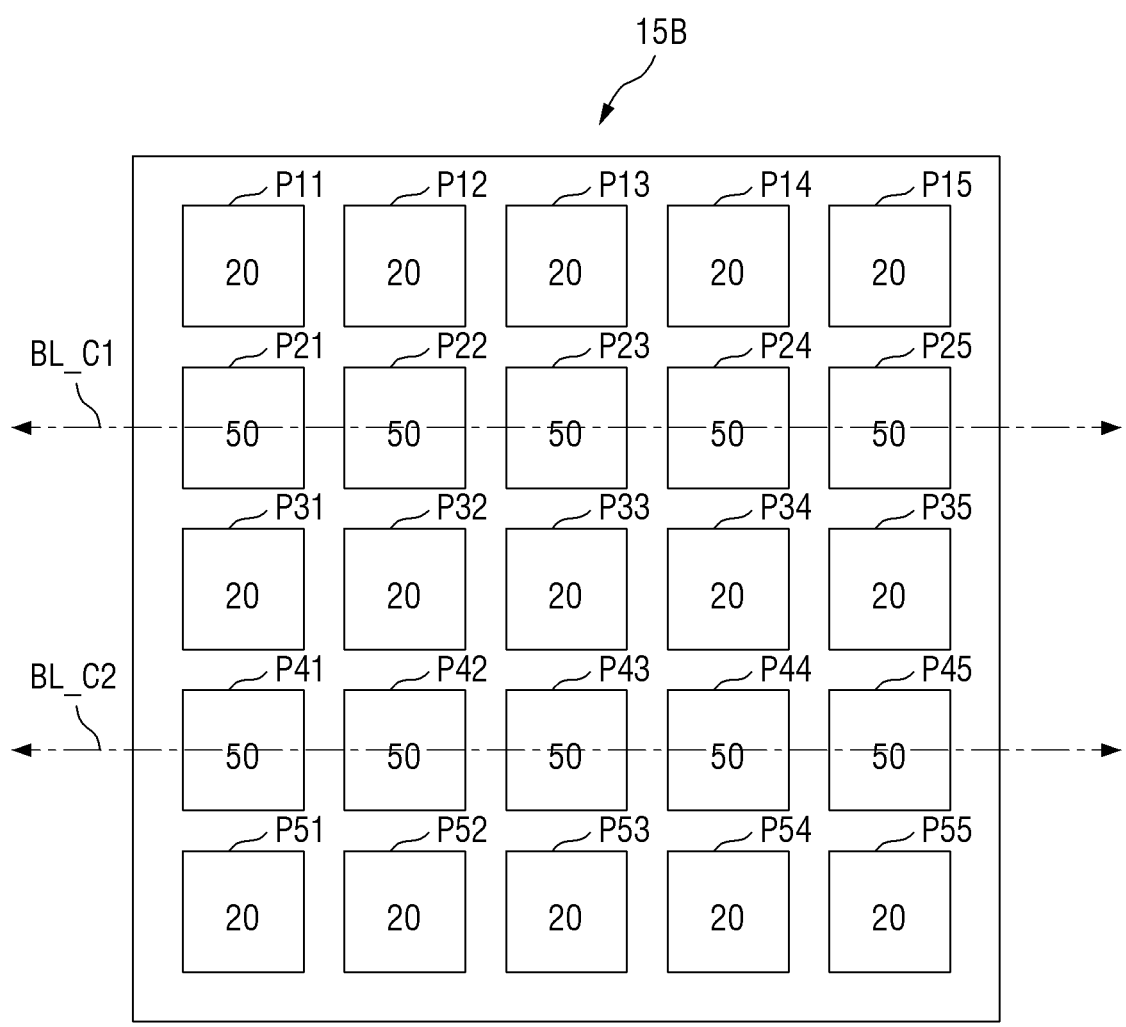

In the embodiment according to FIG. 15, two bending lines BL_c1 and BL_c2 may be respectively disposed along the coordinates (P21, P22, P23, P24, and P25) of the second row and the coordinates (P41, P42, P43, P44, and P45) of the fourth row. Thus, unlike the embodiments according to FIGS. 8, 13 and 14, since the plurality of bending lines BL_c1 and BL_c2 are formed in the embodiment of FIG. 15, it can be ascertained that the display device 16 and the electronic apparatus 10 including the same are bent at two areas along the two bending lines BL_c1 and BL_c2, each of which cross the pressure-sensitive panel 15B.

As described, the bending positions of the display device 16 and the electronic apparatus 10 including the same may be detected and determined through the position at which the bending line BL is formed.

Next, exemplary driving of the first division mode, the second division mode, and the third division mode will be described.

Figure 16:
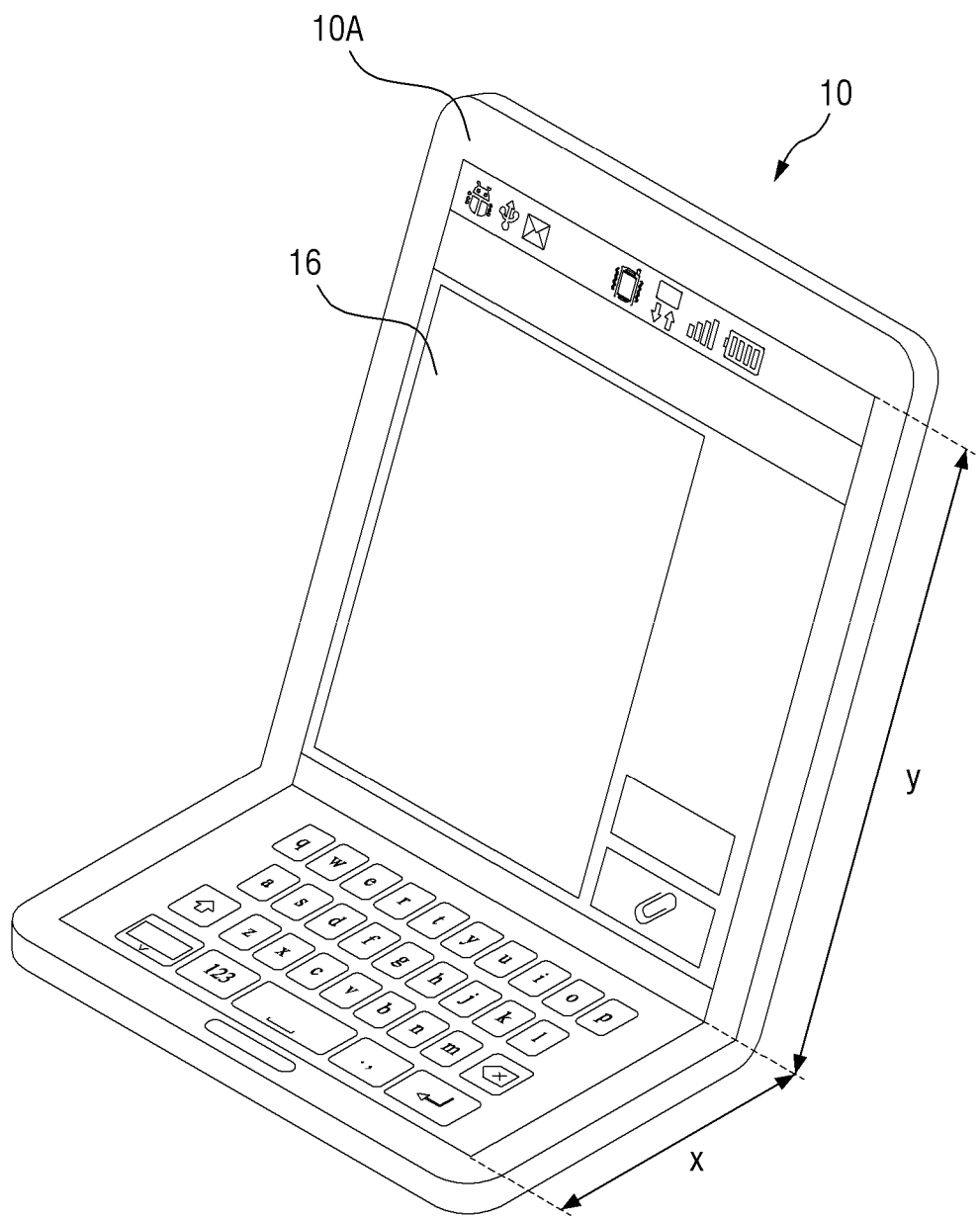
FIG. 16 is a perspective view of an electronic apparatus constructed according to the principles of the invention being driven by an exemplary first division mode.
Figure 17:
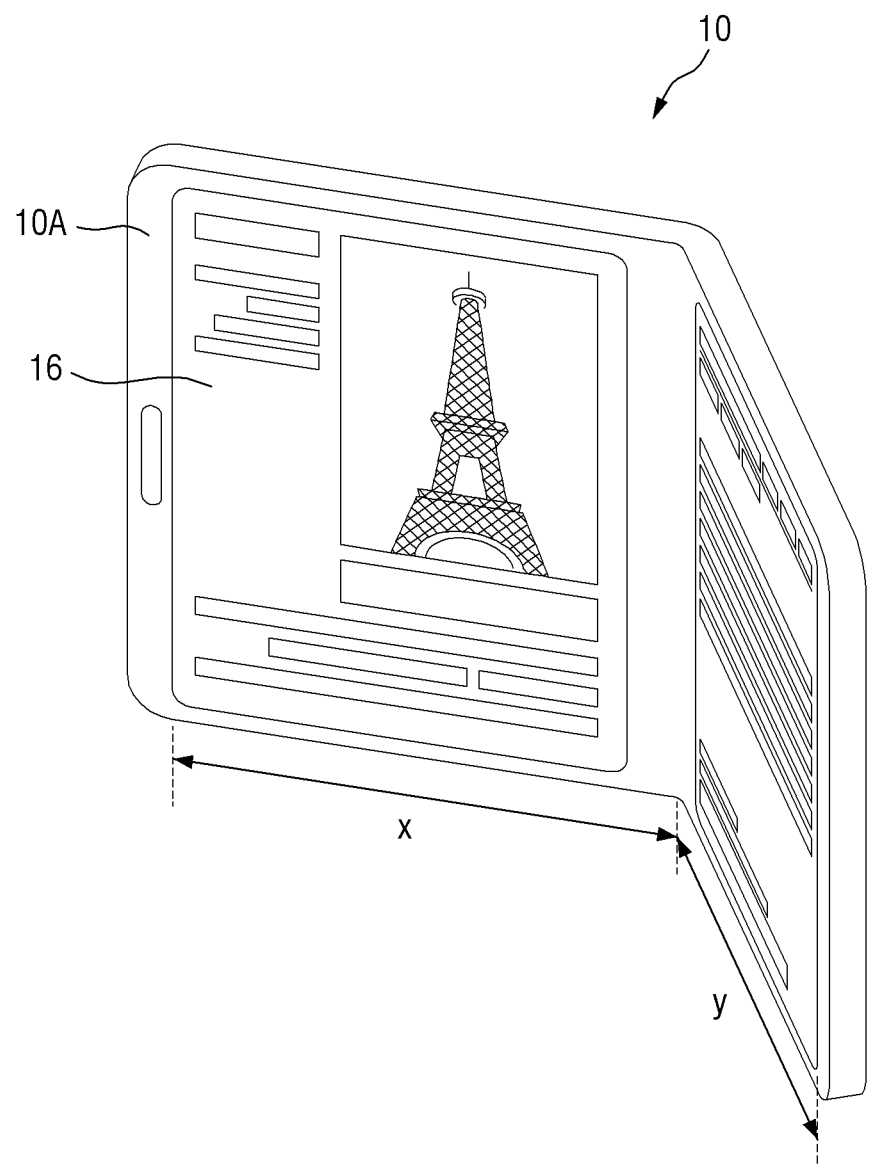
FIG. 17 is a perspective view of an electronic apparatus constructed according to the principles of the invention being driven by an exemplary second division mode.
Figure 18:
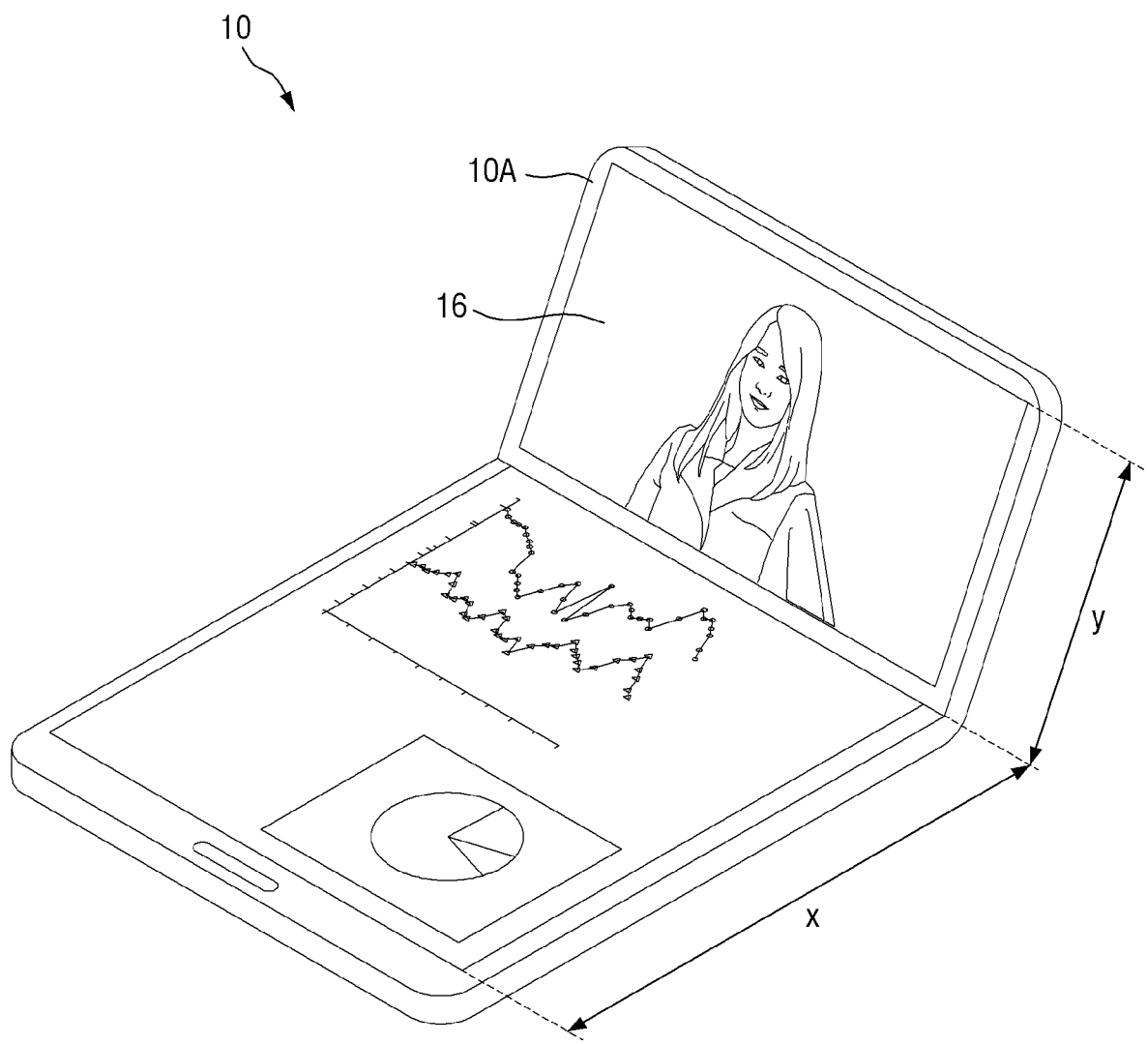
FIG. 18 is a perspective view of an electronic apparatus constructed according to the principles of the invention being driven by an exemplary third division mode.

Referring to FIG. 16 to FIG. 18, the first division mode may be defined as a mode of dividing the display device 16 at a ratio of 2:8 and driving the display device 16, the second division mode may be defined as a mode of dividing the display device 16 at a ratio of 5:5 and driving the display device 16, and the third division mode may be defined as a mode of dividing the display device 16 at a ratio of 8:2 and driving the display device 16. In other embodiments, ratios other than the aforementioned ratios of 2:8, 5:5 and 8:2 may be used.

Referring to FIG. 16, in the first division mode, the display device 16 may be divided at a ratio of 2:8 and display an image. That is, the ratio of x:y in the dimensions shown in FIG. 16 may be 2:8.

Thus, the display device 16 may display a user interface (UI) for performing a function of text input or the like. That is, in the display device 16, the area corresponding to y may display information, such as text or the like, and the area corresponding to x may display a keyboard for inputting a text or the like.

Next, referring to FIG. 17, in the case of the second division mode, the display device 16 may be divided at a ratio of 5:5 and display an image. That is, the ratio of x:y in FIG. 17 may be 5:5.

Thus, the display device 16 may display a user interface (UI) for performing a function of a book. That is, in the display device 16, each of the area corresponding to x and the area corresponding to y may display information about one page of a book.

Next, referring to FIG. 18, in the case of the third division mode, the display device 16 may be divided at a ratio of 8:2 and display an image. That is, the ratio of x:y in the dimensions shown in FIG. 18 may be 8:2.

Thus, the display device 16 may display a user interface (UI) for performing a function such as a video conference or video call. That is, in the display device 16, the area corresponding to x may display information about conference data, such as text or graphics, and the area corresponding to y may display image information of a conference counterpart such as a video image.

The foregoing examples of first to third division modes have been described, but, it should be apparent that various other user interfaces may also be used, and that the position of the bending line BL may vary depending on how the display device is being used.

Figure 19:
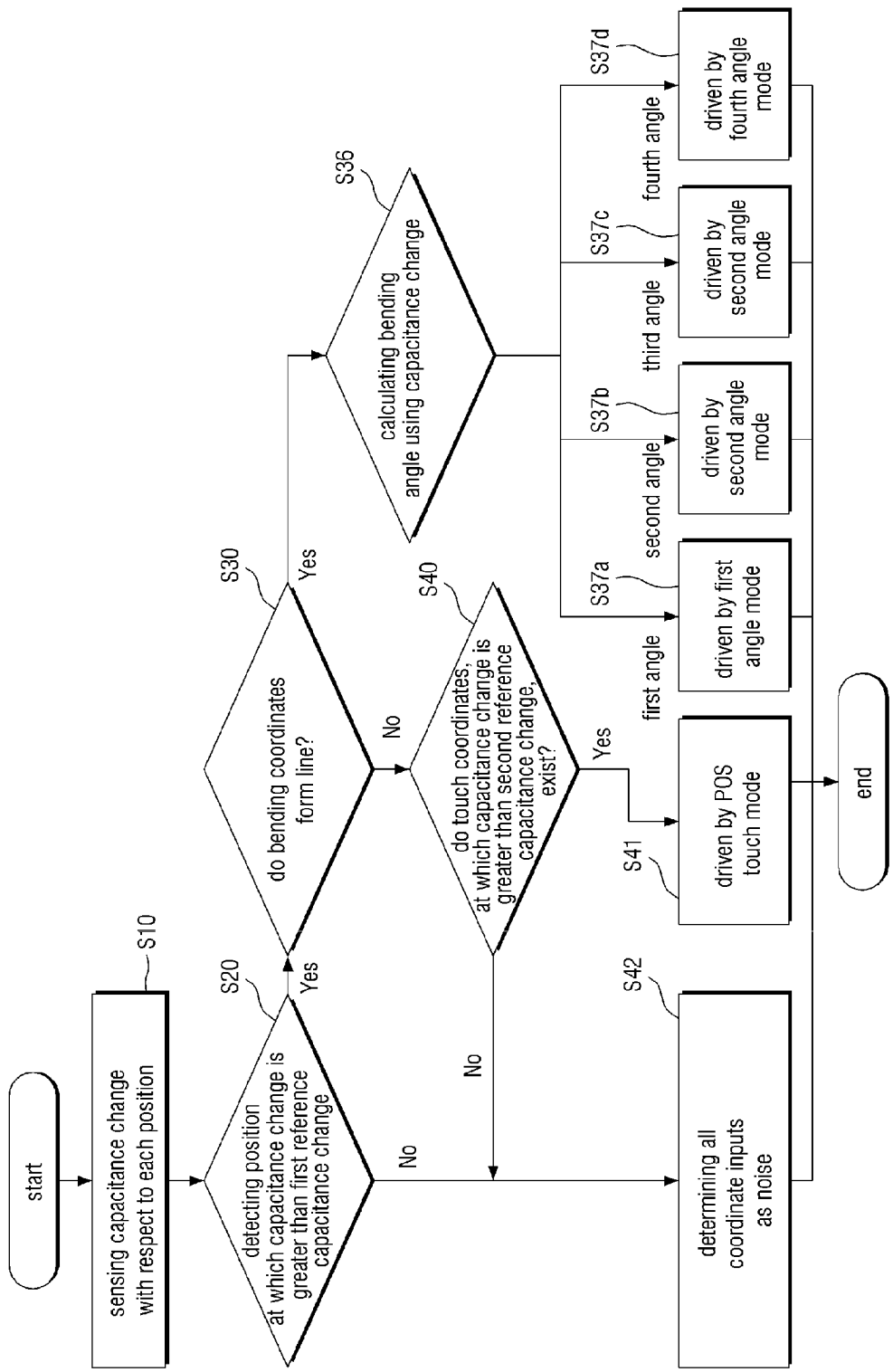
FIG. 19 is a flowchart illustrating a third exemplary method of driving a display device according to the principles of the invention.

Referring to FIG. 19, the method of driving a display device according to this embodiment is different from the method of driving a display device according to the embodiment shown in FIG. 11 in that this embodiment of the method further includes the step of determining a bending angle using a capacitance change (S36). Hereinafter, redundant descriptions will be omitted, and differences will be described.

The method of driving a display device according to this embodiment, compared to the method of driving a display device according to the embodiment shown in FIG. 11, further includes the step of calculating a bending angle using the measured capacitance change (S36), when it is determined that the bending coordinates form the bending line BL (S30).

The bending angle may be in a range of 0° to 180°. When the bending angle is 0°, it means that the display device 16 is not bent, but is flat, and when the bending angle is 180°, it means that the display device 16 is sufficiently bent to allow the front surface thereof to face inwards. When the display device is provided with additional structure for determining a bending direction or is driven by resistance, not by electrostatic capacitance, the bending direction of the display device 16 can be determined, and, in this case, the bending angle may be in a range of −180° to 180°. When the bending angle is −180°, it means that the display device 16 is sufficiently bent to allow the front surface thereof to face outwards to expose the display device 16 to the outside.

The bending angle may be determined in proportion to the capacitance change. That is, as the capacitance change increases, the bending angle increases. The degree of the bending angle may be set based on the absolute value of the bending angle. A detailed description thereof will be described with reference to FIGS. 20 and 21.

Figure 20:
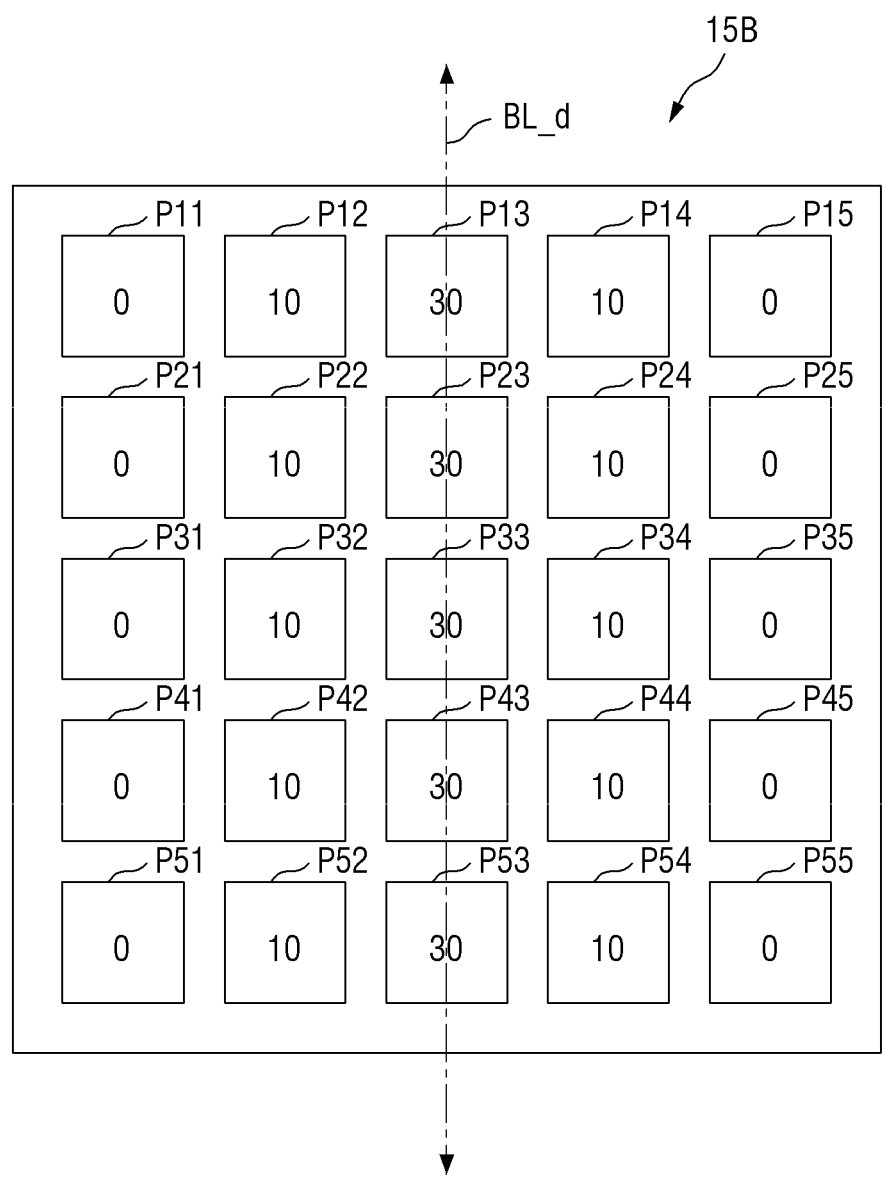
FIGS. 20 and 21 are schematic diagrams illustrating exemplary capacitance changes with respect to each coordinate of the pressure-sensitive panel of FIG. 6 where the bending angles of the display device are different from each other in fifth and sixth configurations.

In the embodiment according to FIG. 20, a bending line BL_d, as in the embodiment according to FIG. 8, may be disposed along the coordinates (P13, P23, P33, P43, and P53) of third columns of the pressure-sensitive panel 15B, but a capacitance change may be maintained at 30 at those coordinates in the embodiment of FIG. 20. In this case, if the first reference capacitance change is set to less than 30, which may be a threshold value where it may be determined that the display device 16 is bent, it may therefore be determined that the display device is bent along the coordinates (P13, P23, P33, P43, and P53) of the third column. However, since the capacitance change detected along the bending line BL_d is less than that in the embodiment shown in FIG. 8, it can be determined that, in the embodiment of FIG. 20, the bending angle is smaller than the corresponding bending angle in the embodiment of FIG. 8.

Figure 21:
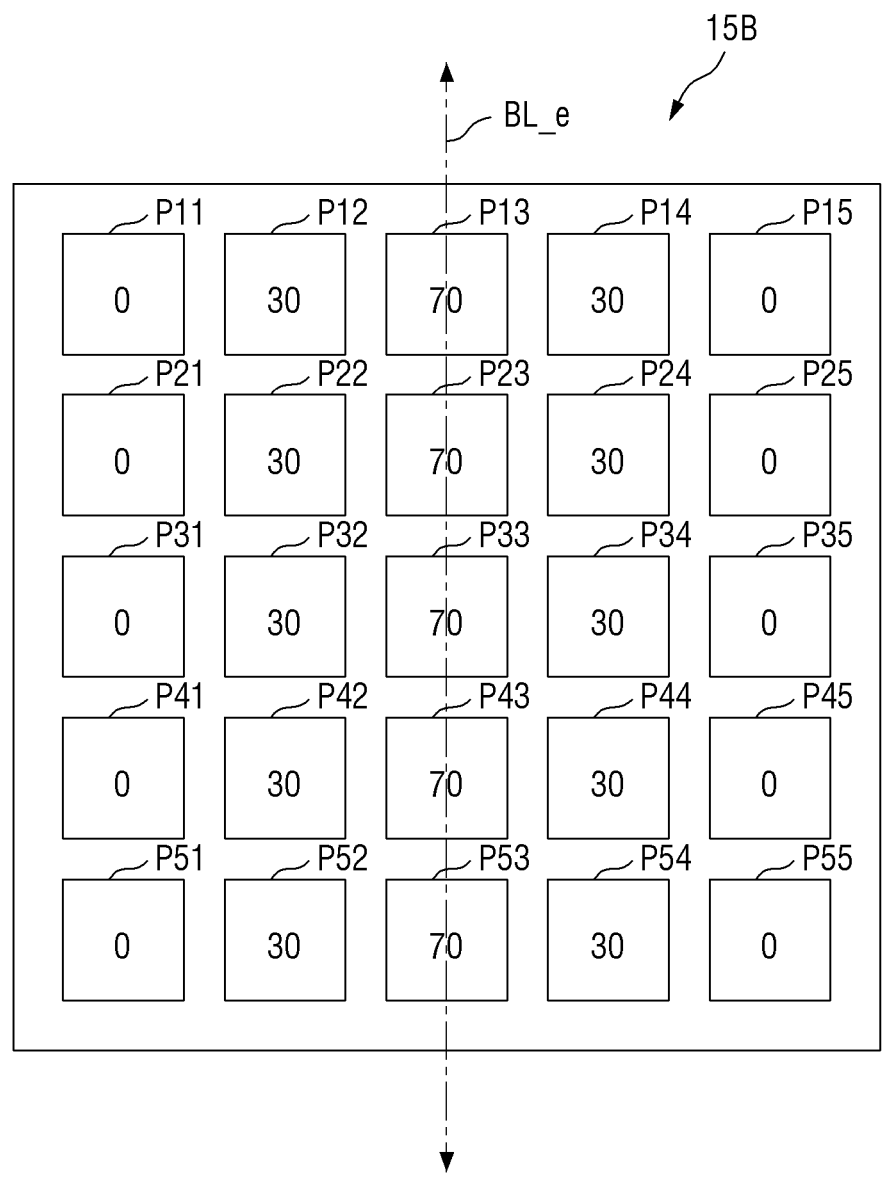

In contrast, in the embodiment according to FIG. 21, a bending line BL_e, as in the embodiment according to FIG. 8, may be disposed along the coordinates (P13, P23, P33, P43, and P53) of third columns of the pressure-sensitive panel 15B, but a capacitance change may be maintained at 70. In this case, if the first reference capacitance change is set to less than 70, which indicates that the display device 16 is bent, it may be determined that the display device is bent along the coordinates (P13, P23, P33, P43, and P53) of third columns. However, since the capacitance change detected along the bending line BL_d is more than that in the embodiment shown in FIG. 8, it can be found that the bending angle become larger.

Next, exemplary driving of first to fifth angle modes will be described.

Figure 22:
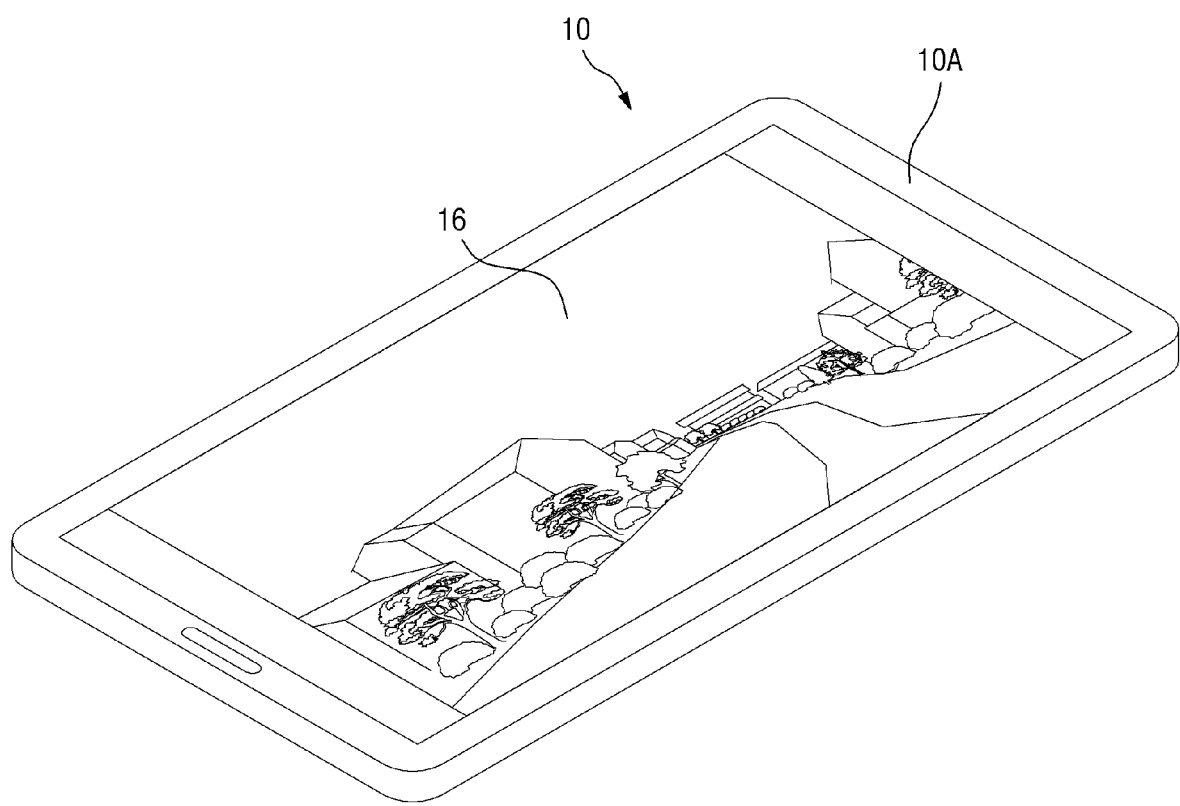
FIG. 22 is a perspective view of an electronic apparatus constructed according to the principles of the invention being driven by a first embodiment of a force touch mode according to the invention.

Referring to FIG. 22, in the case of the force touch mode, the bending angle may be 0°. Thus, the display device 16 and the electronic apparatus 10 including the same may be in a flat orientation, and may be driven by the force touch mode detecting a user's touch input. In this case, one image may be displayed over the entire surface of the display device 16.

Figure 23:
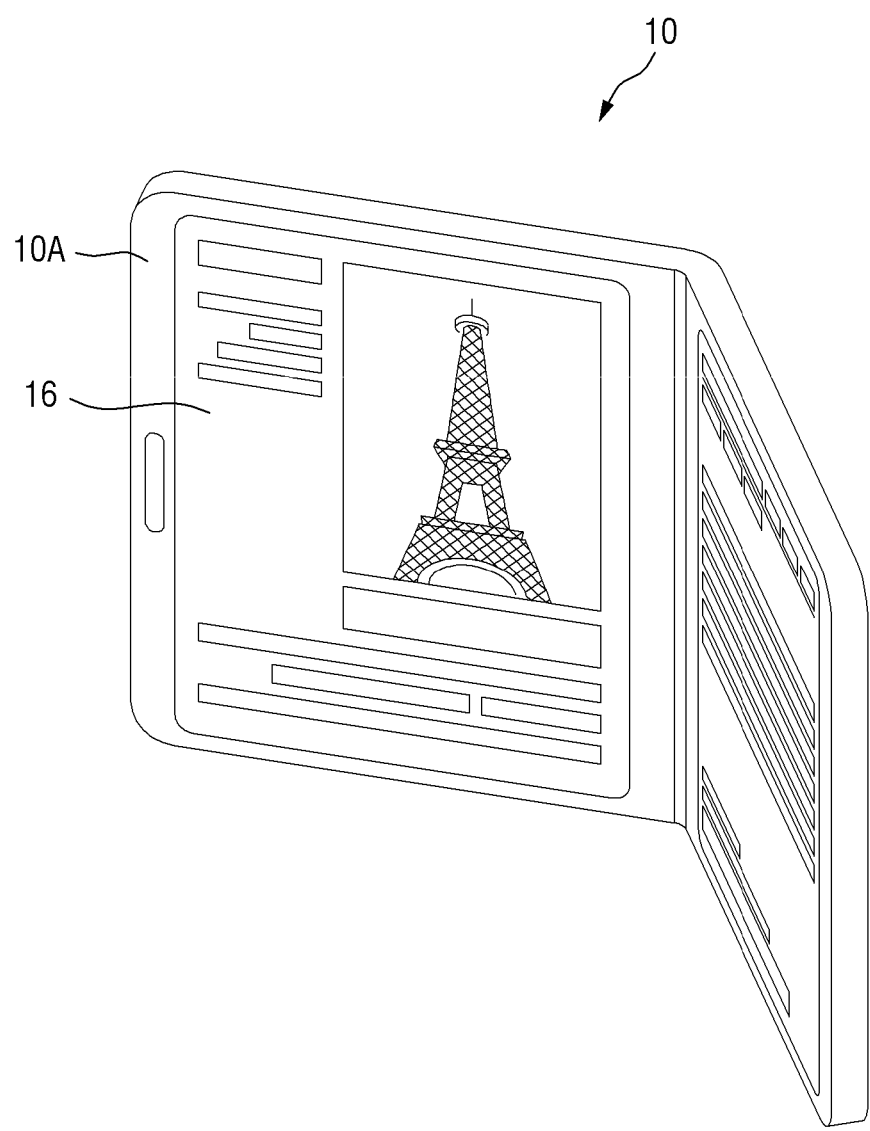
FIG. 23 is a perspective view of the electronic apparatus of FIG. 17, this embodiment being driven by a first angle mode according to the invention.

Referring to FIG. 23, in the case of the first angle mode, the bending angle may be about 60°. Thus, the display device 16 and the electronic apparatus 10 including the same may be maintained with being partially bent, and text information may be displayed on both sides of the display device 16, which may be divided by the bending line BL. That is, the display device 16 may display a user interface for performing a function such as an electronic book.

Figure 24:
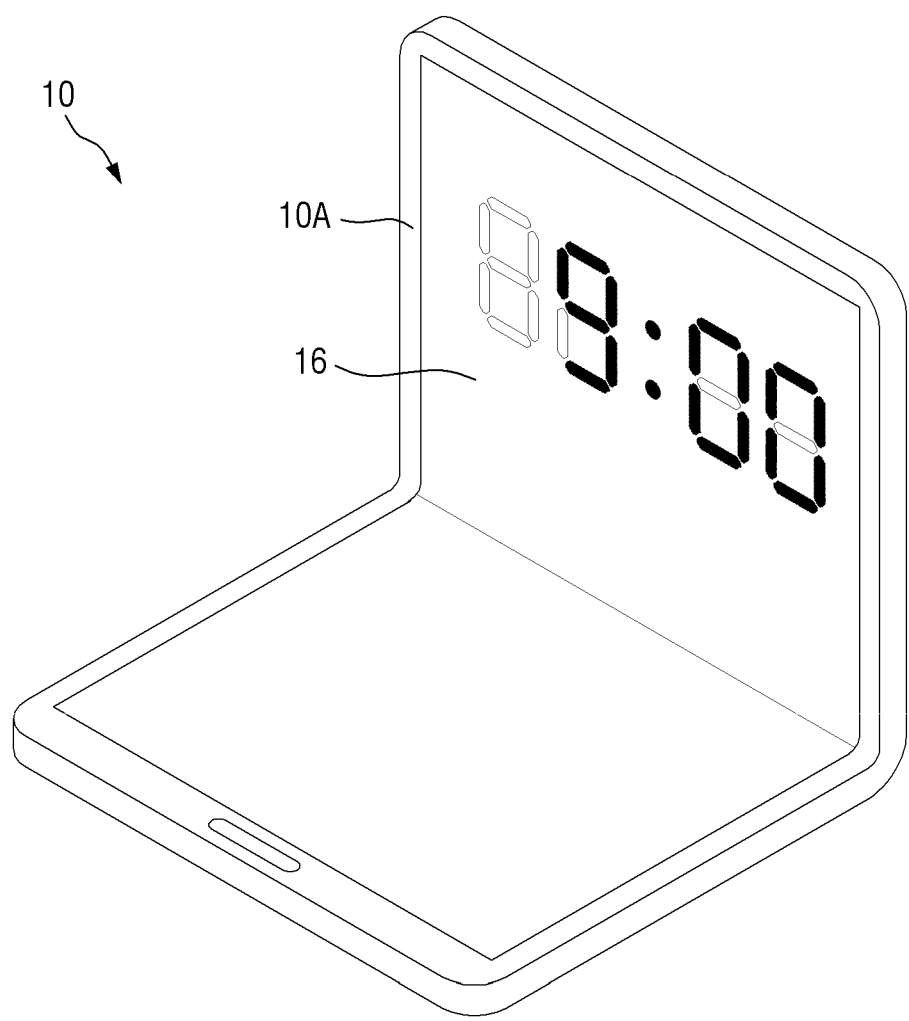
FIG. 24 is a perspective view of an electronic apparatus constructed according to the principles of the invention being driven by a second angle mode according to the invention.

Referring to FIG. 24, in the case of the second angle mode, the bending angle may be 90°. Thus, the display device 16 and the electronic apparatus 10 including the same may be bent from a horizontal into a vertical position, and information related to time may be displayed on one of both sides of the display device 16, which may be divided by the bending line BL. That is, the display device 16 may display a user interface for performing a function of a clock.

Figure 25:
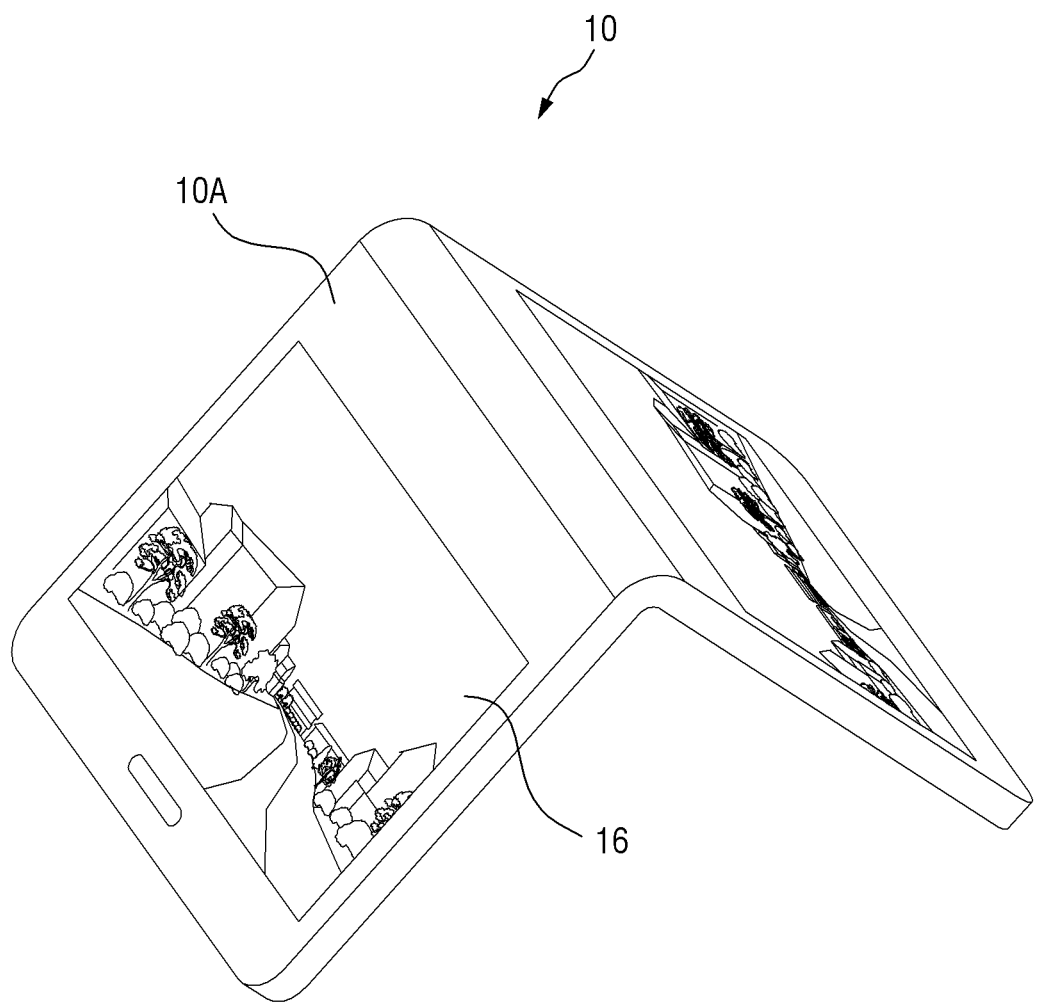
FIG. 25 is a perspective view of a tenth embodiment of an electronic apparatus constructed according to the principles of the invention, this embodiment being driven by a first embodiment of a third angle mode.

Referring to FIG. 25, in the case of the third angle mode, the bending angle may be −90°. Thus, the display device 16 and the electronic apparatus 10 including the same may be kept bent in a reverse direction such that the front and rear surfaces of the display device 16 are exposed, and different images may be displayed on both sides of the display device 16, which may be divided by the bending line BL. That is, the display device 16 may display a user interface capable of allowing different persons to view an image in different directions.

Figure 26:
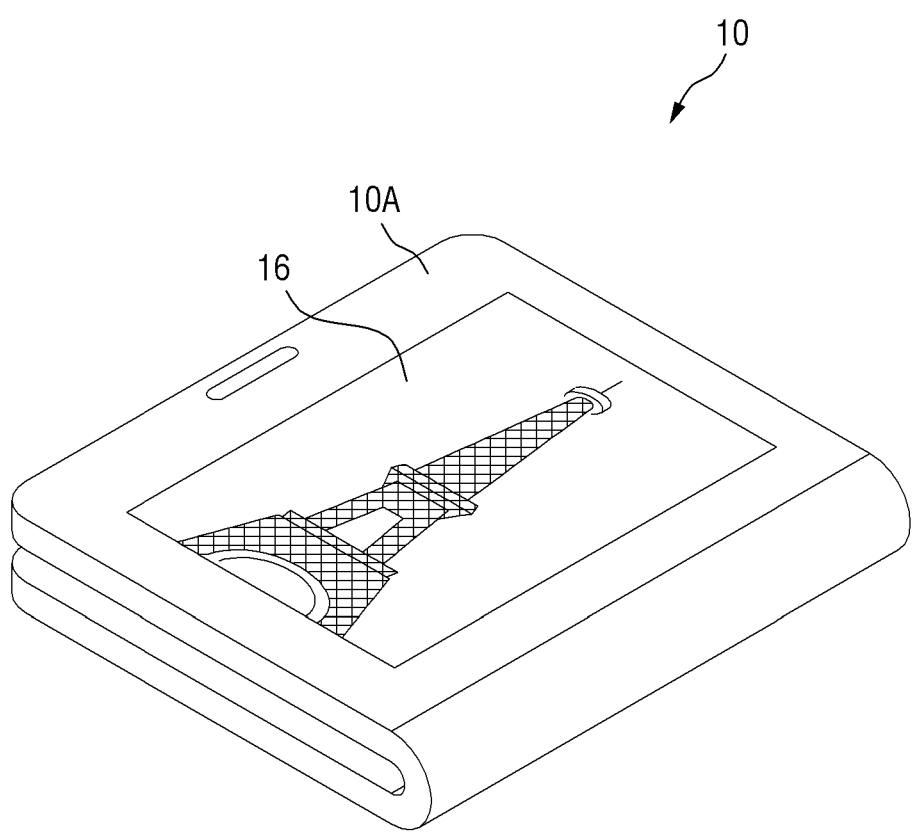
FIG. 26 is a perspective view of an electronic apparatus constructed according to the principles of the invention being driven by a fourth angle mode.

Referring to FIG. 26, in the case of the fourth angle mode, the bending angle may be −180°. Thus, the display device 16 and the electronic apparatus 10 including the same may be kept bent in a reverse direction such that the both sides of the display device 16 are seen and the rear surface of the electronic apparatus 10 is not visible. Moreover, an image may be displayed on one side of the display device 16, which may be divided by the bending line BL. That is, the display device 16 may display a user interface of a power save mode or a mobile phone mode displaying an image using only a part of the display device 16.

The first angle mode, the second angle mode, and the third angle mode described above are merely examples of the bending modes of various embodiments. The driving of the display device 16 is not limited to the first to fourth angle modes as described in these examples. The display device 16 may be driven by a larger number of angle modes, and may also be driven by a smaller number of angle modes.

Figure 27:
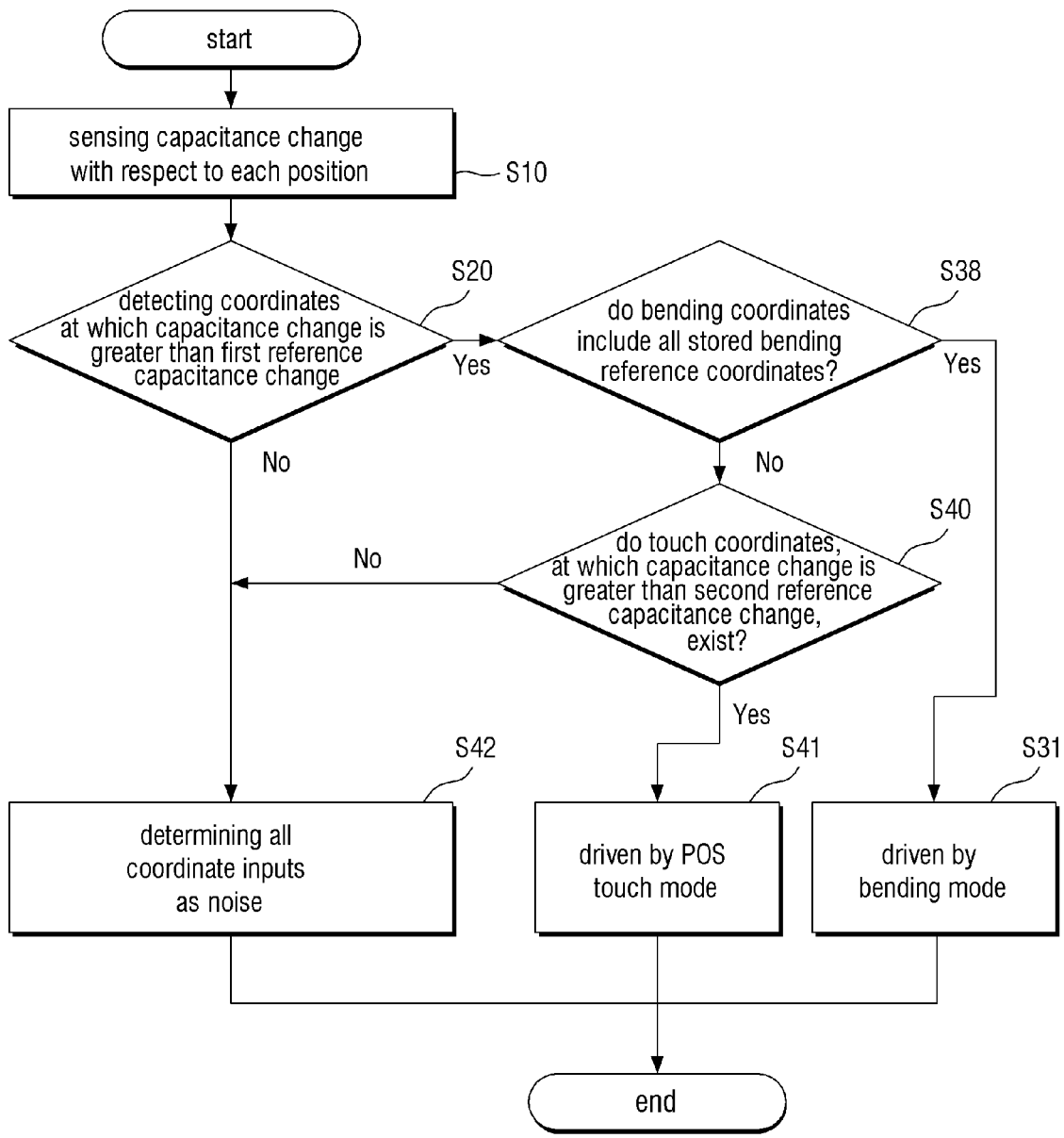
FIG. 27 is a flowchart illustrating a fourth exemplary method of driving a display device according to the principles of the invention.

Referring now to FIG. 27, the method of driving a display device according to this embodiment is different from the method of driving a display device according to the embodiment shown in FIG. 11 in that this embodiment of the method includes the step of determining whether the display device is bent by determining whether the bending coordinates include all stored bending reference coordinates (S38) instead of the step of determining whether the display device is bent by determining whether the bending coordinates form a bending line BL-f (S30). Redundant descriptions will be omitted, and differences will be described.

In the method of driving a display device according to this embodiment, compared to the method of driving a display device according to the embodiment of FIG. 11, whether the bending coordinates include all of the stored bending reference coordinates may be determined (S38) by comparing the bending coordinates with the stored bending reference coordinates when it is determined that the bending coordinates having a capacitance change larger than the first reference capacitance change are detected (S30). The bending reference coordinates may be stored in the memory unit 13.

Figure 28:
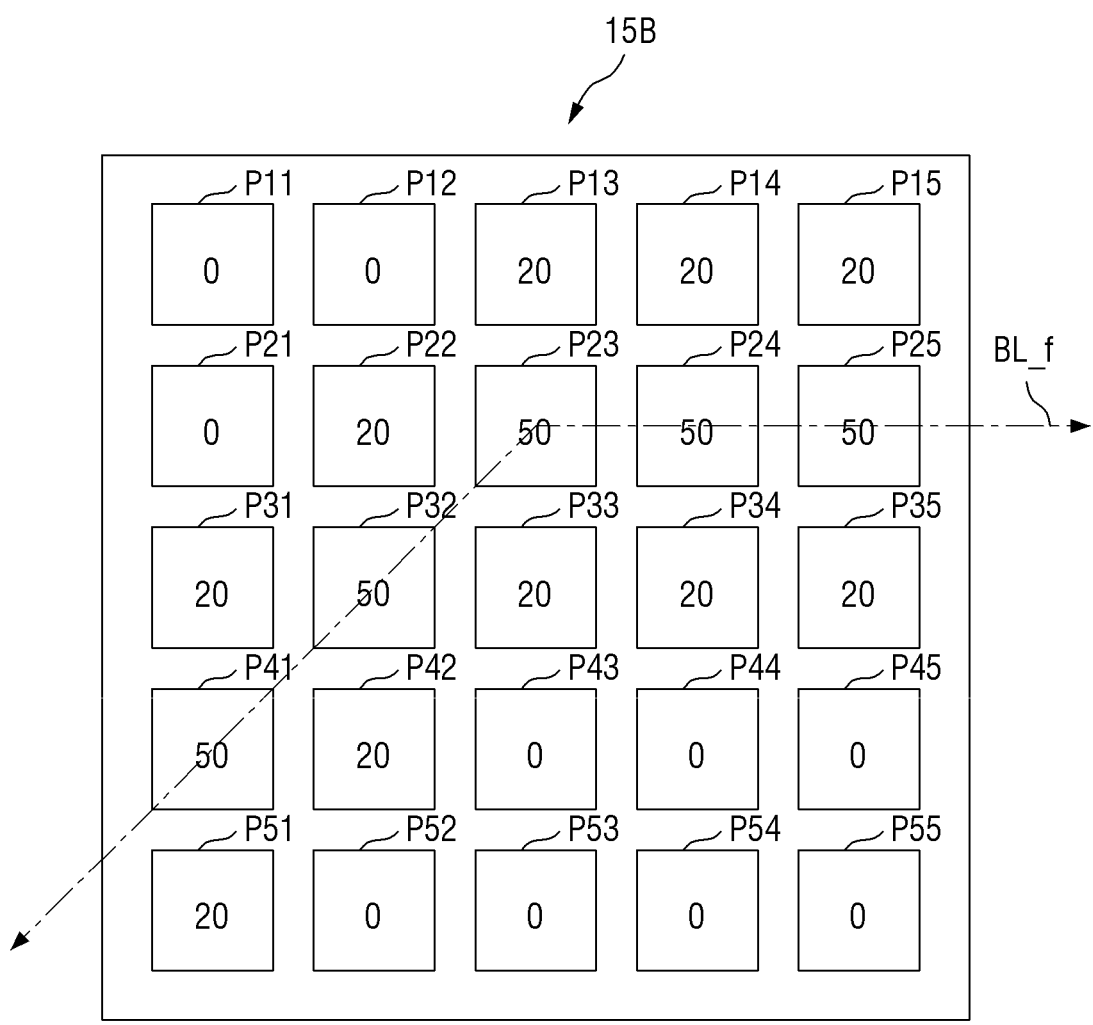
FIG. 28 is a schematic diagram illustrating exemplary capacitance changes with respect to each coordinate of the pressure-sensitive panel of FIG. 6 when the display device is bent in a seventh configuration.

If the bending coordinates include all of the bending reference coordinates, it may be determined that the display device is bent. A detailed description thereof will be described with reference to FIG. 28.

The value of the first reference capacitance change may be set to 30, and, in this case, the bending coordinates may be disposed over the coordinate (P23) of second row and third column, the coordinate (P24) of second row and fourth column, the coordinate (P25) of second row and fifth column, the coordinate (P32) of third row and second column, and the coordinate (P41) of fourth row and first column. If the stored bending reference coordinates are also set to the coordinate (P23) of second row and third column, the coordinate (P24) of second row and fourth column, the coordinate (P25) of second row and fifth column, the coordinate (P32) of third row and second column, and the coordinate (P41) of fourth row and first column, it may be determined that the bending coordinates include the bending reference coordinates. Accordingly, it may be determined that the bending line BL_f extends along coordinate (P23) of second row and third column, the coordinate (P24) of second row and fourth column, the coordinate (P25) of second row and fifth column, the coordinate (P32) of third row and second column, and the coordinate (P41) of fourth row and first column, and that the display device is bent along coordinate (P23) of second row and third column, the coordinate (P24) of second row and fourth column, the coordinate (P25) of second row and fifth column, the coordinate (P32) of third row and second column, and the coordinate (P41) of fourth row and first column.

In this configuration, whether the display device is bent may be determined even when the bending line BL_f is not a single straight line.

Figure 29:
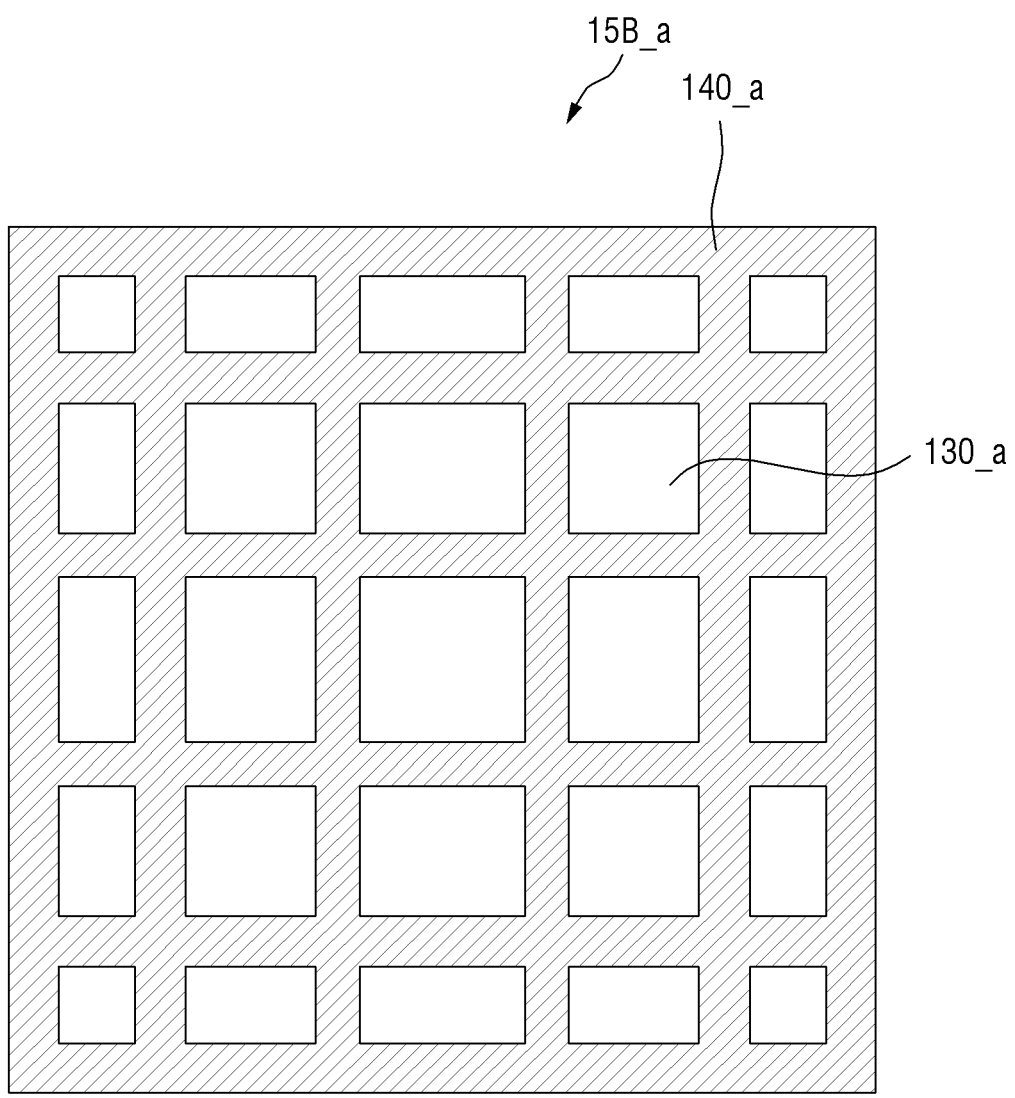
FIG. 29 is a plan view of a second embodiment of a pressure-sensitive panel constructed according to the principles of the invention.

In FIG. 29, among the components of a pressure-sensitive panel 15B_a, an upper electrode 140_a having a pattern and an elastic layer 130_a disposed beneath the upper electrode 140_a are shown. Since other components of the pressure-sensitive panel 15B_a may be the same as those described with reference FIG. 4, differences will be described.

Referring to FIG. 29, the upper electrode 140_a of the pressure-sensitive panel 15B_a according to this embodiment defines one or more openings having a designated pattern. For example, rectangular openings may be formed in the upper electrode 140, and these openings may be formed to have a larger area as they approach the center of the pressure-sensitive panel 15B_a. The elastic layer 130_a disposed beneath the upper electrode 140_a may be exposed toward the front surface of the upper electrode 140_a through the openings formed in the upper electrode 140_a. However, when the elastic layer 130_a is transparent, the metal-made lower electrode 120 disposed beneath the elastic layer 130_a may also be exposed toward the front surface of the upper electrode 140_a through the openings.

When the upper electrode 140_a has the aforementioned pattern, the difference in pressed degree between the edge and center of the pressure-sensitive panel 15B_a with respect to each position can be compensated. That is, when pressure is applied to the edge of the pressure-sensitive panel 15B_a, the pressured degree may decrease compared to when the same pressure is applied to the center of the pressure-sensitive panel 15B_a. A frame for maintaining the appearance of the display device 16 and protecting the display device from external impact may be disposed at the edge of the pressure-sensitive panel 15B_a, and the distance between the upper electrode 140_a and lower electrode 120 adjacent to the edge of the pressure-sensitive panel 15B may be maintained by the frame.

Therefore, the difference of pressed degree of the pressure-sensitive panel 15B_a with respect to each position can be compensated through the pattern of the upper electrode 140_a. Thus, the pressure applied to the pressure-sensitive panel 15B-a can be detected more accurately.

Figure 30:
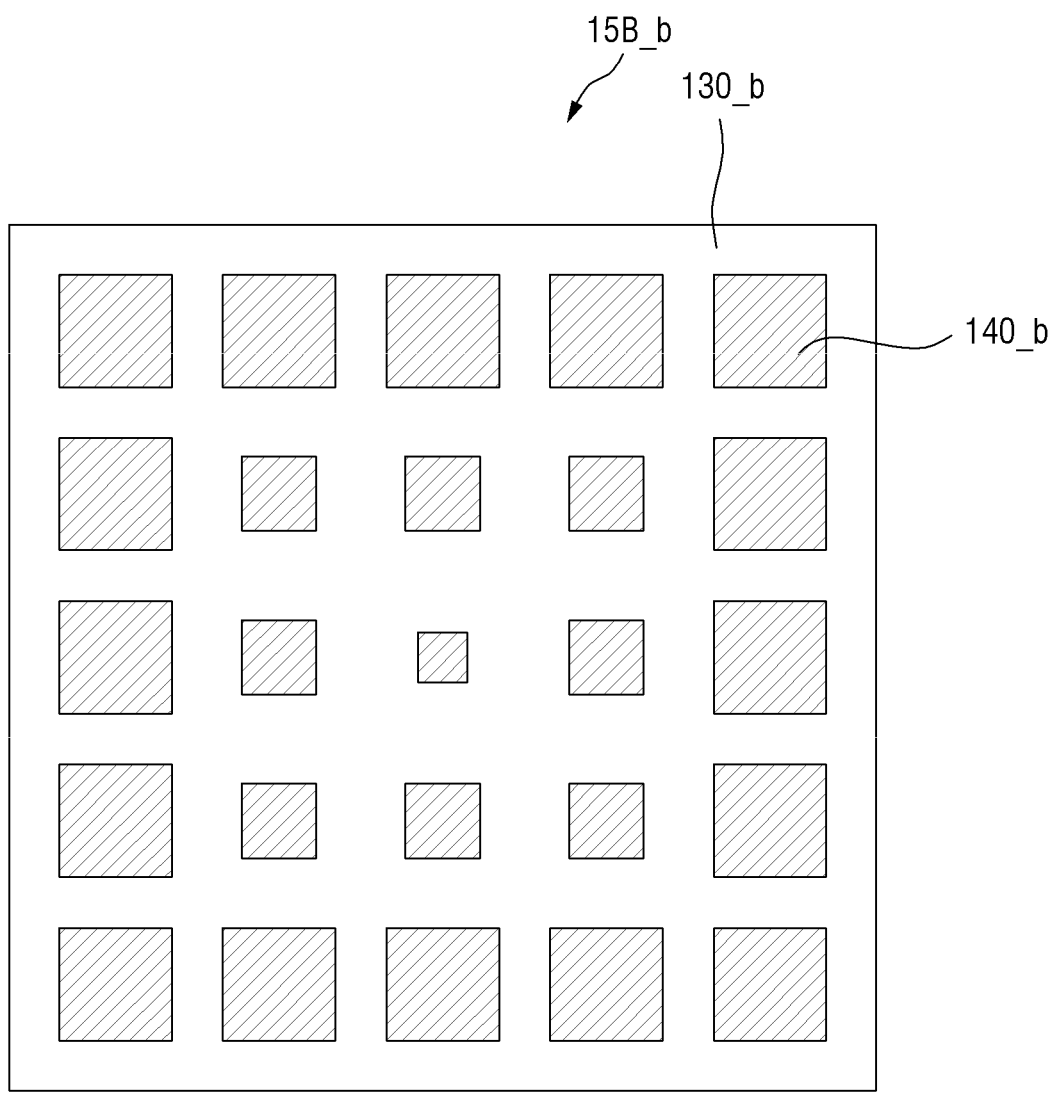
FIG. 30 is a plan view of a third embodiment of a pressure-sensitive panel constructed according to the principles of the invention.

In FIG. 30, among the components of a pressure-sensitive panel 15B_b, an upper electrode 140_b having a pattern and an elastic layer 130_b disposed beneath the upper electrode 140_b are shown. Since other components of the pressure-sensitive panel 15B_b may be the same as those described with reference FIG. 4, differences will be described.

Referring to FIG. 30, the upper electrode 140_b of the pressure-sensitive panel 15B_b according to this embodiment has a specific pattern. The upper electrode 140_b may have a structure in which a plurality of rectangular metal plates are arranged over most or all of the front surface of the pressure-sensitive panel 15B_b. The metal plates may be electrically connected with each other. Moreover, the metal plates may be formed to have a smaller area as they approach the center of the pressure-sensitive panel 15B_b, and may be formed to have a larger area as they approach the edge of the pressure-sensitive panel 15B_b.

Although the upper electrode 140_a shown in FIG. 2 is configured to form the rectangular openings, this upper electrode 140_b shown in FIG. 30 has a structure in which the plurality of rectangular metal plates are arranged over most or all of the front surface of the pressure-sensitive panel 15B_b. Therefore, when the metal plates are formed to have a smaller area as they approach the center of the pressure-sensitive panel 15B_b, the difference of pressed degree of the pressure-sensitive panel 15B_b with respect to each position can be compensated. Thus, the pressure applied to the pressure-sensitive panel 15B_b can be detected more accurately.

Next, the sectional structure of the display device 16 shown in FIG. 31 will be described in more detail.

Figure 31:
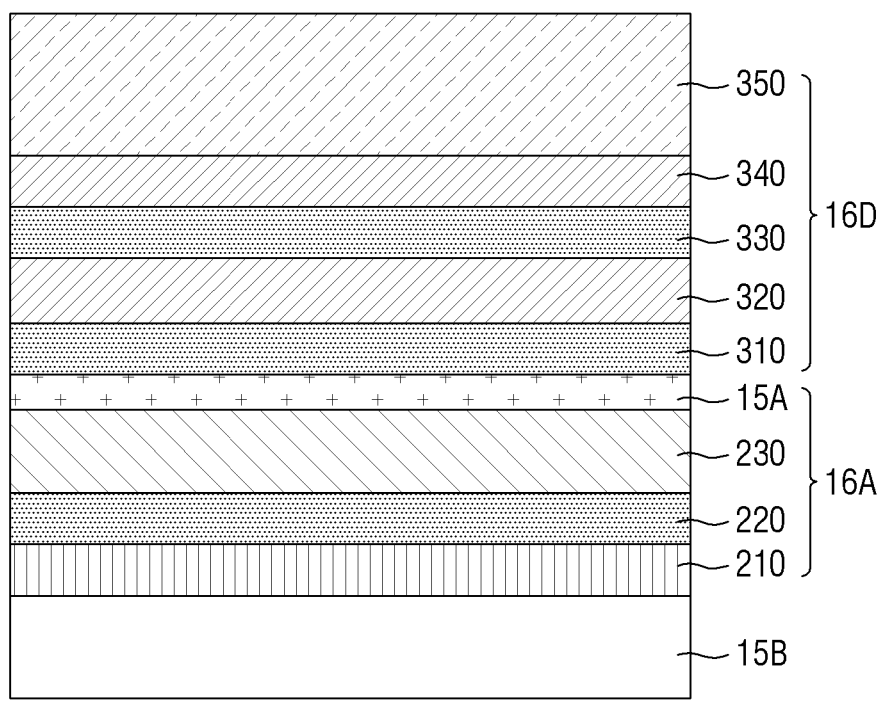
FIG. 31 is a side sectional view of a second embodiment of a display device constructed according to the principles of the invention.

Although the section of the display device 16 shown in FIG. 31 corresponds to the section of the display device 16 according to the embodiment shown FIG. 3, the components thereof are shown in more detail in FIG. 31. However, since the detailed sectional structure of the pressure-sensitive panel 15B have been described with reference to FIG. 4, a description of the detailed sectional structure of the pressure-sensitive panel 15B will be omitted.

Referring to FIG. 31, the display device 16 includes a window 16D, a display panel 16A, and a pressure-sensitive panel 15B.

The window 16D may include a first window film 320, a second window film 340, a third window film 350, a second adhesive film 310, and a third adhesive film 330, and the display panel 16A may include a touch panel 15A, a first adhesive film 220, and a lower protection film 210.

The display device 16 may be provided with the pressure-sensitive panel 15B on the rear surface thereof.

The lower protection film 210 may be disposed on the pressure-sensitive panel 15B. The lower protection film 210 may protect the components disposed on the lower protection film 210 from an impact at the rear surface of the lower protection film 210. The lower protection film 210 may be made of one or more of polyester resins, such as polyethylene terephthalate, polyethylene naphthalate, polybutylene terephthalate, and polybutylene naphthalate, polycarbonate resins, polyimide resins, polystyrene resins, and poly(meth)acrylate resins, such as polymethylmethacrylate.

The first adhesive film 220 may be disposed on the lower protection film 210. The first adhesive film 220 may fix the components disposed on the front and rear surfaces of the first adhesive film 220 to each other by generating an adhesion force onto the front and rear surfaces of the first adhesive film 220 in response to the applied pressure during a process of manufacturing the display device 16.

A display layer 230 may be disposed on the first adhesive film 220. The display layer 230 may form an image by emitting light that can be viewed by a user. The display layer 230 may form an image by using a display method using an organic light-emitting element. However, the display method is not limited thereto, and any type of display method that can be curved and bent may also be used.

The second adhesive film 310 may be disposed on the display layer 230. The second adhesive film 310 may perform the same role as the first adhesive film 220, and may be made of the same material as the first adhesive film 220.

The first window film 320 may be disposed on the second adhesive film 310. The first window film 320 may protect the components disposed on the rear surface of the first window film 320 from damage caused by an impact at the front surface of the first window film 320, may provide strength for bending the display device 16, and may provide an elastic force for restoring a previous position of the display device 16 after ceasing a bending of the display device 16. The first window film 320 may be made of optically transparent and flexible resin. For example, the first window film 320 may be made of one or more of polyester resins, such as polyethylene terephthalate, polyethylene naphthalate, polybutylene terephthalate, and polybutylene naphthalate, polycarbonate resins, polyimide resins, polystyrene resins, and poly(meth)acrylate resins, such as polymethylmethacrylate. Further, when the first window film 320 is a hard coating layer, the hard coating layer may have a pencil strength of 6H or more, and may be made of a siloxane resin.

The third adhesive film 330 may be disposed on the first window film 320. The third adhesive film 330, similarly to the second adhesive film 310, may performed the same role as the first adhesive film 220, and may be made of the same material as the first adhesive film 220.

The second window film 340 may be disposed on the third adhesive film 330. The second window film 340 may perform the same role as the first window film 320, and may be made of the same material as the first window film 320. Meanwhile, when the first window film 320 and the second window film 340 are formed to have a double structure, the components disposed under the first window film 320 can be protected, and the display device 16 can be controlled so as not to be excessively bent.

The third window film 350 may be disposed on the second adhesive film 310. The third window film 350, unlike the first window film 320 and the second window film 340, may have a pencil strength of 6H or more, and may be made of a polyurethane resin or a siloxane resin.

The third window film 350 can more strongly protect the components disposed under the third window film 350 from damage caused by an impact to the front surface of the third window film 350 better than would the first window film 320 and the second window film 340.

Figure 32:
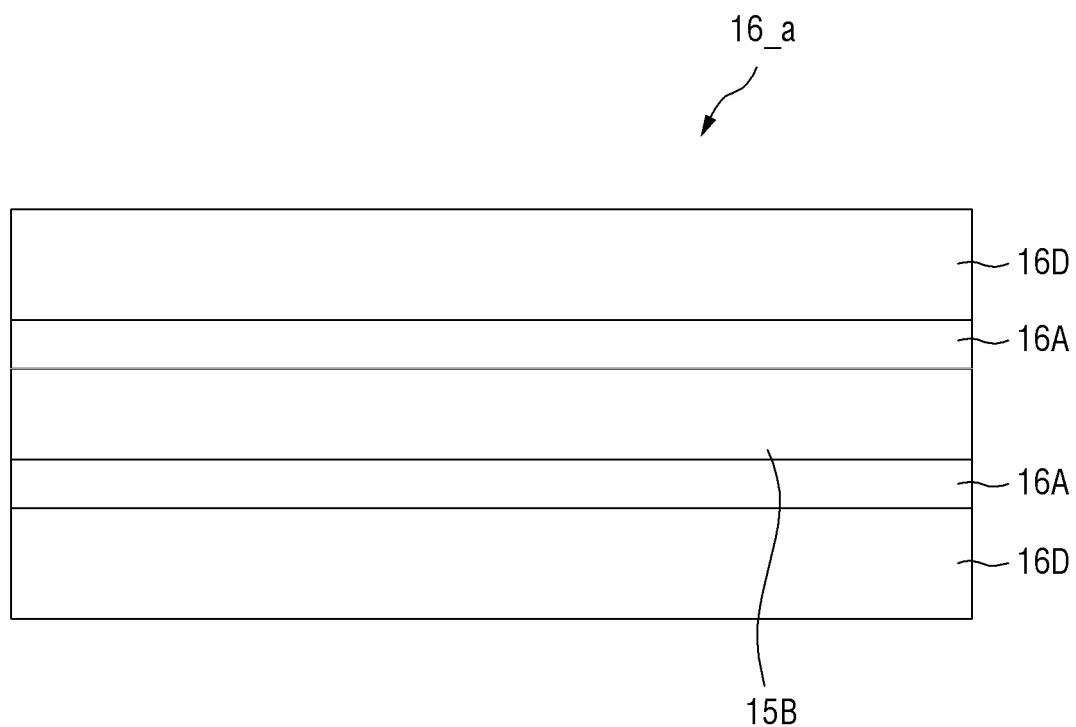
FIG. 32 is a side sectional view of a third embodiment of a display device constructed according to the principles of the invention.

Referring to FIG. 32, the display device 16_a according to this embodiment is different from the display device 16 shown in FIG. 3 in that display panels 16A and windows 16D are disposed on both sides of a pressure-sensitive panel 15B. Redundant descriptions will be omitted, and differences will be described.

The display panels 16A may be respectively disposed on the front and rear surfaces of the pressure-sensitive panel 15B. Further, the windows 16D may be disposed on the respective display panels 16A. Therefore, the display device 16_a according to this embodiment may display an image on both sides thereof.

In this case, similarly to the aforementioned embodiments, whether the display device 16_a is bent may be determined using the pressure-sensitive panel 15B and any one of the touch panel 15A included in the upper display panel 16A and the pressure-sensitive panel 15B included in the lower display panel 16A.

Figure 33:
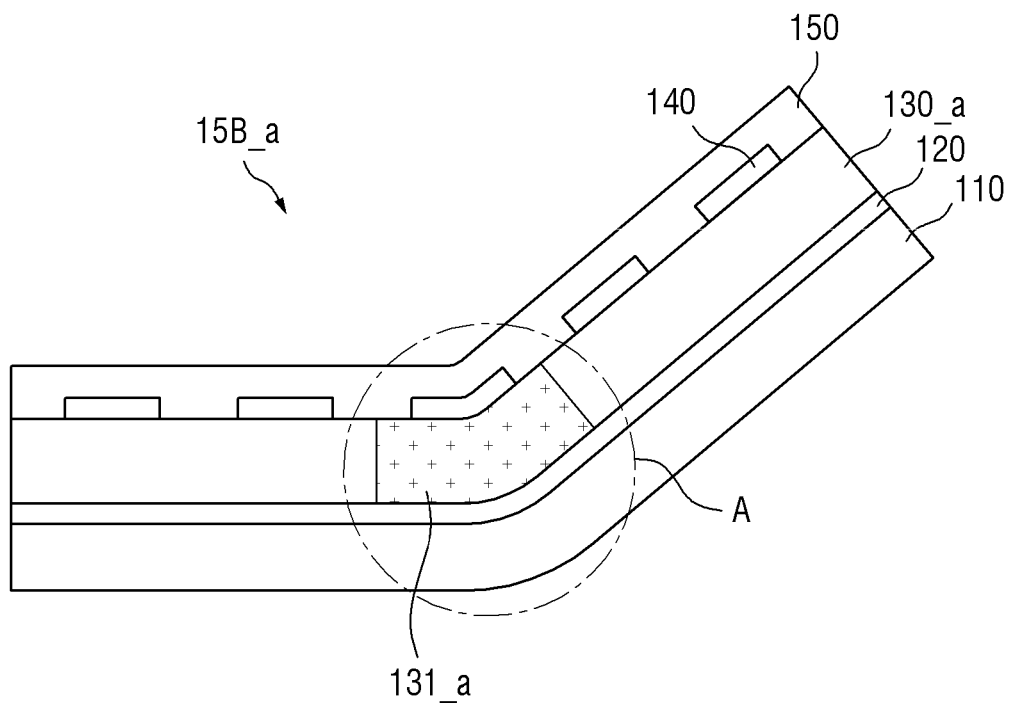
FIG. 33 is a side sectional view of a fourth embodiment of a pressure-sensitive panel constructed according to the principles of the invention.

Referring to FIG. 33, the pressure-sensitive panel 15B_a according to this embodiment is different from the pressure-sensitive panel 15B shown in FIG. 4 in that a part of the elastic layer 130_a is replaced by a smart fluid 131_a. Redundant descriptions will be omitted, and differences will be described.

The smart fluid 131_a may be a fluid whose viscosity is changed in response to electrical or magnetic signals. For example, the smart fluid 131_a may be any one of a magnetic fluid, a magneto-rheological (MR) fluid, and an electro-rheological (ER) fluid.

The smart fluid 131_a has relatively low viscosity under normal conditions. Such a viscosity is capable of performing the same role as the elastic layer 130_a when pressure is applied thereto. However, when a magnetic field or an electric field is applied to the smart fluid 131_a, the viscosity of the smart fluid 131_a increased, and thus this smart fluid 131-a may be converted into a high-viscosity liquid or a solid. Thus, the pressure-sensitive panel 15B of the area A, to which an electrical field or a magnetic field is applied, may have enough mechanical strength to maintain the appearance of the display device 16. That is, the pressure-sensitive panel 15B may have enough mechanical strength to maintain the appearance of the display device 16 without additional components (for example, hinge) maintaining the appearance of the display device 16.

As the components applying the electrical or magnetic field to the smart fluid 131_a, the upper electrode 140 and lower electrode 120 disposed on the front and rear surfaces of the smart fluid 131_a may be used, even when a metal layer for controlling the smart fluid 131_a is not used, the electrical or magnetic field formed in the smart fluid 131_a can be controlled, so as to adjust the mechanical strength of the display device 16.

In this embodiment, a structure in which a part of the elastic layer 130_a is replaced by the smart fluid 131_a is shown, but it should be apparent that different structures in which some other portion or all of the elastic layer 130_a is replaced by the smart fluid 131_a to have mechanical strength that is free to be adjusted at any position may also be used.

Accordingly, there can be provided a flexible display device that can determine details regarding the bending of the flexible display as described herein without providing an additional sensor.

Further, there can be provided a method of driving a flexible display device that can determine the bending of the flexible display without providing an additional sensor.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A display device, comprising:
a bendable display panel configured to display an image; and
a pressure-sensitive panel overlapping the display panel and configured to detect capacitance change corresponding to a position on a front surface of the display panel according to a touch input of a user or a position of a bending of the display panel,
wherein:
the pressure-sensitive panel is driven either in a touch mode in which the capacitance change is occurred at the position of the touch input of the user or is driven in a bending mode in which the capacitance change is occurred at the position of the bending of the display panel; and
a range of the capacitance change in the touch input mode is different from a range of the capacitance change in the bending mode.

2. The display device of claim 1, further comprising a touch panel overlapping the display panel,
wherein:
the pressure-sensitive panel is disposed on one surface of the display panel; and
the touch panel is disposed on the other surface opposite to the one surface of the display panel and is an electrostatic touch panel.

3. The display device of claim 1, wherein a first difference between a first maximum capacitance and a first minimum capacitance among the capacitance changes in the touch input mode is greater than a second difference between a second maximum capacitance and a first minimum capacitance among the capacitance changes in the bending mode.

4. The display device of claim 1, wherein the capacitance changes in the bending mode varies according to a bending angle of the display panel.

5. The display device of claim 1, wherein the display panel includes a plurality of display areas in the bending mode.

6. The display device of claim 5, wherein:
a first display area and a second display area on a front surface of the display panel among the plurality of display areas display the image in a first bending mode; and
the bending angle of the display panel is a first angle in the first bending mode.

7. The display device of claim 6, wherein:
one of the first display area and the second display area display the image in a second bending mode; and
the bending angle of the display panel is a second angle greater than the first angle in the second bending mode.

8. The display device of claim 7, wherein:
a third display area and a fourth display area on a rear surface of the display panel among the plurality of display areas display the image in a third bending mode; and
the bending angle of the display panel is a third angle greater than the second angle in the third bending mode.

9. The display device of claim 8, wherein:
one of the third display area and the fourth display area display the image in a fourth bending mode; and
the bending angle of the display panel is a fourth angle greater than the third angle in the fourth bending mode.

10. The display device of claim 1, wherein:
the pressure-sensitive panel comprises:
a lower electrode;
an elastic layer disposed on the lower electrode; and
an upper electrode disposed on the elastic layer and insulated from the lower electrode; and
the capacitance change is a value based upon a change in capacitance between the lower electrode and the upper electrode.

11. The display device of claim 10, wherein the upper electrode comprises a plurality of openings.

12. The display device of claim 11, wherein the openings have a same size.

13. The display device of claim 11, wherein the openings have different sizes.

14. The display device of claim 13, wherein the openings have a larger area as the openings approach a center of the pressure-sensitive panel.

15. The display device of claim 10, wherein:
the upper electrode comprises a plurality of metal plates; and
the metal plates are formed to have a smaller area as the metal plates are disposed at the center of the pressure-sensitive panel and are formed to have a larger area as the metal plates are disposed at the edge of the pressure-sensitive panel.

16. A method of driving a flexible display device, comprising:
detecting a capacitance change with respect to first coordinates of a display area;
determining whether bending is occurring through the detected capacitance change; and
setting a driving mode in response to a result of the step of determining whether bending is occurring;
wherein the step of determining whether bending is occurring comprises:
detecting bending coordinates at which the capacitance change is greater than a first reference capacitance change; and
detecting whether the detected bending coordinates form a line.

17. The method of claim 16, wherein the step of determining whether bending is occurring further comprises determining that bending is not occurring in case that the bending coordinates are not detected or in case that the bending coordinates do not form a line.

18. The method of claim 16, wherein the driving mode is set into a bending mode in case that bending is occurring, and the driving mode is set into a force touch mode in case that bending is not occurring.

19. The method of claim 18, further comprising detecting touch coordinates at which the capacitance change is greater than a second reference capacitance change in case that bending is not occurring,
wherein the second reference capacitance change is greater than the first reference capacitance change.

20. The method of claim 19, wherein in the step of setting the driving mode, driving is set to the force touch mode in case that the touch coordinates are detected.

* * * * *